United States Patent
Yamamoto et al.

(10) Patent No.: US 9,672,432 B2
(45) Date of Patent: Jun. 6, 2017

(54) IMAGE GENERATION DEVICE

(75) Inventors: Kinji Yamamoto, Anjo (JP); Kazuya Watanabe, Anjo (JP); Shoko Takeda, Yokkaichi (JP); Kenji Miura, Chiryu (JP); Jun Kadowaki, Kariya (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 347 days.

(21) Appl. No.: 14/114,665

(22) PCT Filed: May 23, 2012

(86) PCT No.: PCT/JP2012/063188
§ 371 (c)(1),
(2), (4) Date: Oct. 29, 2013

(87) PCT Pub. No.: WO2012/169355
PCT Pub. Date: Dec. 13, 2012

(65) Prior Publication Data
US 2014/0063197 A1 Mar. 6, 2014

(30) Foreign Application Priority Data

Jun. 9, 2011 (JP) .................................. 2011-129322
Jun. 9, 2011 (JP) .................................. 2011-129323

(51) Int. Cl.
*G06K 9/00* (2006.01)
*G08G 1/16* (2006.01)
(Continued)

(52) U.S. Cl.
CPC ..... *G06K 9/00805* (2013.01); *G06K 9/00255* (2013.01); *G06T 3/00* (2013.01);
(Continued)

(58) Field of Classification Search
CPC ...... G06K 9/00805; G06T 3/00; G06T 11/001
(Continued)

(56) References Cited

U.S. PATENT DOCUMENTS 6,100,895 A * 8/2000 Miura ..................... G06T 15/50
345/426
2003/0076414 A1 4/2003 Sato et al.
(Continued)

FOREIGN PATENT DOCUMENTS

DE 102010010912 A1 2/2010
JP 2003-189293 A 7/2003
(Continued)

OTHER PUBLICATIONS

Japanese Office Action, dated Dec. 12, 2013, issued in counterpart Japanese Patent Application No. 2011-129323.
(Continued)

*Primary Examiner* — Jeffery Williams
(74) *Attorney, Agent, or Firm* — Sughrue Mion, PLLC

(57) ABSTRACT

An image generation device that enhances visual recognizability between a recognized 3D (three-dimensional) object and a substitute image synthesized in an area of a 3D object image which is a photographed image of the 3D object includes an image synthesis section that recognizes a 3D object present in the peripheral area of a vehicle and outputs 3D object attribute information indicative of attributes of this 3D object, determines a 3D object image area as an image area of the 3D object in the photographed image based on position information included in the 3D object attribute information, outputs at least one of a substitute image of the 3D object applied with a color based on the color information and a substitute image of the 3D object under a specified directional posture of the 3D object specified based on type information and directional posture information and generates a bird's-eye view image with a substitution image in which the substitution image outputted from a substitution image output section is synthesized at the position of the 3D object image area.

14 Claims, 16 Drawing Sheets

(51) Int. Cl.
*G06T 3/00* (2006.01)
*G06T 11/00* (2006.01)
*G06T 15/20* (2011.01)
*H04N 7/18* (2006.01)

(52) U.S. Cl.
CPC .......... *G06T 11/001* (2013.01); *G06T 15/205* (2013.01); *G08G 1/166* (2013.01); *B60R 2300/607* (2013.01); *H04N 7/18* (2013.01)

(58) Field of Classification Search
USPC .......................................................... 348/46
See application file for complete search history.

(56) References Cited

U.S. PATENT DOCUMENTS

| | | | | |
|---|---|---|---|---|
| 2006/0210114 | A1* | 9/2006 | Oka | B60R 1/00 382/104 |
| 2006/0274147 | A1* | 12/2006 | Chinomi | B60R 1/00 348/118 |
| 2008/0198226 | A1 | 8/2008 | Imamura | |
| 2009/0237269 | A1* | 9/2009 | Okugi | B60R 1/00 340/901 |
| 2010/0119157 | A1* | 5/2010 | Kameyama | H04N 19/115 382/195 |
| 2010/0201508 | A1* | 8/2010 | Green | B60Q 9/008 340/435 |
| 2012/0126965 | A1* | 5/2012 | Sanma | B62D 1/046 340/438 |
| 2013/0107052 | A1 | 5/2013 | Gloger et al. | |

FOREIGN PATENT DOCUMENTS

| | | | | |
|---|---|---|---|---|
| JP | 2003189293 | A | * 7/2003 | ............... G06T 3/00 |
| JP | 2004302939 | A | * 10/2004 | |
| JP | 2008-182312 | A | 8/2008 | |
| JP | 2008-199549 | A | 8/2008 | |
| JP | 2008-205914 | A | 9/2008 | |
| JP | 2009-252092 | A | 10/2009 | |
| JP | 2010-251939 | A | 11/2010 | |

OTHER PUBLICATIONS

English Translation of International Preliminary Report on Patentability for PCT/JP2012/063188 dated Dec. 27, 2013.
International Search Report of PCT/JP2012/063188, Dated Aug. 28, 2012.
Communication dated Jan. 23, 2015 from the European Patent Office in counterpart application No. 12796019.3.

* cited by examiner

IMAGE GENERATION DEVICE

CROSS REFERENCE TO RELATED APPLICATIONS

This is a National Stage of International Application No. PCT/JP2012/063188 filed May 23, 2012, claiming priority based on Japanese Patent Application Nos. 2011-129322 filed Jun. 9, 2011 and 2011-129323 filed Jun. 9, 2011 the contents of all of which are incorporated herein by reference in their entirety.

TECHNICAL FIELD

The present invention relates to an image generation device configured to output, as a displaying image, a bird's-eye view image generated by projection transformation with an upper virtual viewpoint of a photographed image obtained by an in-vehicle camera for photographing a peripheral area of a vehicle.

BACKGROUND ART

With a conventional bird's-eye view generation device, a bird's-eye view from immediately above the self vehicle is generated by projecting a photographed image obtained by an in-vehicle camera onto a projection plane parallel with the road surface, that is, through projection transformation with a virtual viewpoint being located perpendicularly upwards. Therefore, by displaying this bird's-eye view on a monitor, the driver's grasping of the road surface situation of the vehicle surrounding is assisted. However, with a bird's-eye view obtained through such projection transformation, there occurs signification distortion in the image for a faraway region as compared with a region nearby the in-vehicle camera, which distortion makes it difficult for the driver to obtain the sense of distance. Especially, a three-dimensional ("3D" hereinafter) object (this can be not only a human, a vehicle, but also an on-road obstacle such as a road (traffic) cone for a construction work) placed on the road surface and extending upward therefrom will be shown as a deformed shape object elongated in the photographing direction, thus presenting difficulty in visual recognition.

In order to overcome such problem as above, for example, a vehicle periphery image display system disclosed in Patent Document 1 includes a camera for photographing the vehicle periphery, an obstacle detecting means for detecting an obstacle present in the periphery of the self vehicle, a memory section for storing in advance substitute images corresponding to obstacles, and an image processing section for generating a bird's-eye view from a virtual viewpoint of the self-vehicle periphery based on an image obtained by the camera. When the obstacle detecting means detects an obstacle, the image processing section identifies this object and selects and retrieves a substitute image corresponding to the identified obstacle from the memory section and then changes the directional posture and the inclination of the selected substitute image in accordance with the virtual viewpoint and superposes this with the bird's-eye view. With this system, the image processing section converts an image obtained by the photographing means into a bird's-eye view from a upwardly or laterally of the vehicle. Then, based on the information from the obstacle detecting means, the image processing section selectively determines a substitute image corresponding to the size and movement of the 3D obstacle from the memory section and displays this substitute image in overwriting superposition on the bird's-eye view.

However, in case a substitute image is displayed in place of the obstacle image imaging the actual 3D obstacle, there can sometimes happen a situation in which the driver finds it difficult to identify the substitute image and the actual 3D obstacle. For instance, when the detected 3D obstacle is a human and an image of human represented in the form of an illustration (or an icon) or a photo is displayed, if the display screen is small, it is difficult to determine whether the human image on the display screen is identical to the actual human confirmed via a rearview mirror or the driver's eyes. Also, in case the display screen is small, it can become difficult even to recognize that the image represents a human. Moreover, if the substitute image shows a forward facing human although the actually recognized human is assuming a rearward facing directional posture, the identification becomes difficult. Further, in case a detected 3D obstacle is an automobile, if the substitute image shows a sedan facing forward although the actually recognized automobile is a minivan facing rearward, the identification becomes difficult similarly.

PRIOR ART DOCUMENT

Patent Document

Patent Document 1: Japanese Unexamined Patent Application Publication No. 2010-251939 (paragraphs [0008-0056], FIG. 7, FIG. 10)

SUMMARY OF THE INVENTION

Object to be Solved by Invention

In view of the above-described state of the art, there is a need for a technique that enhances the visual recognizability between a recognized 3D object and a substitute image synthesized in the area of a 3D object image which is a photographed image of this 3D object.

Solution

According to the present invention, an image generation device configured to output, as a displaying image, a bird's-eye view image generated by projection transformation with an upper virtual viewpoint of a photographed image obtained by an in-vehicle camera for photographing a peripheral area of a vehicle, comprising:

a 3D object recognition section for recognizing a 3D (three-dimensional) object present in the peripheral area and outputting 3D object attribute information representing attributes of the 3D object;

a 3D object area determination section for determining a 3D object image area which is an image area of the 3D object in the photographed image based on position information included in the 3D object attribute information;

a substitute image output section for outputting at least one of a substitute image of the 3D object colored with a color based on color information included in the 3D object attribute information and a substitute image of the 3D object with a directional posture identified for the 3D object identified based on type information and directional posture information included in the 3D object attribute information; and an image synthesis section for generating a bird's-eye view image synthesized and attached with a substitute image outputted from the substitute image output section at a position in the 3D object image area.

This inventive configuration is based on a finding that the discriminating identification between an actual 3D object and a substitute image on a display screen is improved by adding to the substitute image a color corresponding to the actual 3D object, whereby the visual recognizability between the actual 3D object and the substitute image is enhanced.

With the above-described configuration provided by the present invention, a recognized 3D object included in the photographed image will be included in the bird's-eye view image in the form of a substitute image distinctly showing the feature of this 3D object, in particular, its characteristic color. Therefore, the driver can readily recognize the 3D object present in the vehicle periphery from this bird's-eye view image attached with this substitute image.

As methods of outputting a colored substitute image, there are known methods as follows. In one known method, colorless substitute images or substitute images added with particular colors are prepared in the form of database according to the types, shapes or the like thereof. Then, a substitute image retrieved with using a type, a shape, etc. as a search condition is outputted with coloring or color change thereof based on color information of the actual 3D object. In another known method, substitute images added in advance with various colors are prepared in the form of database. Then, a substitute image retrieved with using a type, a shape, or the like thereof added with the color information as a search condition is selected and outputted. In case the 3D object is a human, considering that the colors of its clothing will vary in many ways, the former method is preferred since this method allows reduction in the amount or number of substitute images to be stored in the database, in comparison with the latter method. Therefore, according to one preferred embodiment of the present invention, the substitute image output section includes:

a substitute image database storing substitute images of 3D objects based on color information;

a substitute image retrieval section for retrieving, from the substitute image database, a substitute image of the 3D object based on 3D object type information included in the 3D object attribute information; and a substitute image coloration section for coloring a substitute image retrieved by the substitute image retrieval section with a color based on color information included in the 3D object attribute information.

When a recognized 3D object has a plurality of colors, it is preferred that the coloring be effected with the plurality of colors as much as possible. Hence, according to one preferred embodiment of the present invention, the substitute image coloration section is configured to determine a plurality of colors that characterize the 3D object, based on the color information and to paint the substitute image with the plurality of different colors. As a method of painting a substitute image with a plurality of different colors, it is proposed to calculate an average color of the lower half of the height of 3D object and an average color of the upper half of the height of 3D object in the photographed image and to paint the lower half and the upper half of the height of the 3D object with these respective average colors. Further, considering that the painting area of the substitute image is small, it is effective to increase the chroma of the average color so as to realize coloration with conspicuous colors.

When the substitute image coloration section colors a substitute image based on color information, rather than using simply a same color as the photographed image, considering the discriminating visibility, it is preferred to employ an enhanced color such as a color with increased chroma, a color easily distinguished from the peripheral color, the typical color of the 3D object (pure red in the case of a mailbox) or a gradation color for a moving object which color can show the direction of its movement, etc. Therefore, according to one preferred embodiment of the present invention, there is provided a color enhancement instruction section for outputting a color enhancement instruction for enhancing the color to be added to the substitute image by the substitute image coloration section, based on the 3D object attribute information.

A bird's-eye photographed view can be generated with using projection transformation with shifting the viewpoint upwards from the photographed image. Yet, if the original (source) photographed image comprises a plurality of photographed images photographing front, rear, right and left peripheries of the vehicle, it is possible to generate a bird's-eye view photographed image looking down on the vehicle periphery area about the vehicle. Further, if a substitute image is synthesized for this bird's-eye view photographed image, it is also possible to restrict the substitute image becoming distorted by the projection transformation to present difficulty in visibility. Therefore, according to one preferred embodiment of the present invention, there is provided a bird's-eye view photographed image generation section for generating a bird's-eye view photographed image from a plurality of photographed images covering the vehicle periphery and having different photographing directions with using projection transformation, and the image synthesis section apples the substitute image to the 3D object image area of the bird's-eye view photographed image.

Further, as this bird's-eye view photographed image generation section for processing a plurality of photographed images having different photographing directions is added with the function of effecting projection transformation with different viewpoint from the photographed image, it becomes also possible to create a bird's-eye view photographed image attached with a substitute image, which provides a feel of difference relating to the viewpoint between the bird's-eye view photographed image and the substitute image and a feel of difference after the projection transformation in harmonization with each other.

Further, it is possible to obtain the moving direction of a 3D object by evaluating the recognitions of 3D object over time. Based on this, according to one preferred embodiment of the present invention, in addition to the substitute image, the device further comprises an image showing the moving direction of the 3D object. As one specific example of such image showing the moving direction of 3D object, it is possible to generate an image showing the moving direction as an after-image of the substitute image corresponding to the movement of the 3D object. As another example, it is proposed to generate an image showing the moving direction in the form of an arrow.

Moreover, the substitute image output section can be configured to include:

a substitute image database storing substitute images of 3D objects based on type information and directional posture information; and a substitute image retrieval section for retrieving, from the substitute image database, the substitute image with using the type information and the directional posture information included in the 3D object attribute information as a search condition. With this, the substitute image retrieval section can retrieve the substitute image for the 3D object from the substitute image database, based on the 3D object attribute information.

Further, preferably, the 3D object recognition section includes a face detection section for detecting a human face, and based on detection result by the face detection section, the recognized 3D object comprising a human is set as the type information and one of the forward-facing directional posture, a rearward-facing directional posture and a lateral-facing directional posture is set as the directional posture information. With this arrangement, when a face is included, it is determined that this 3D object is a human; and further based on the directional posture of its face, the directional posture of the human, the lateral facing directional posture or the forward facing directional posture can be surmised.

Moreover, preferably, in the 3D object recognition section, based on inter-vehicle communication information obtained by inter-vehicle communication, a recognized 3D object comprising an automobile is set as the type information, and the automobile assuming one of the forward facing directional posture, the rearward facing directional posture and the lateral facing directional posture is set as the directional posture information. With this arrangement, it is readily possible to set the directional posture, the vehicle type, the vehicle color of the 3D object (an automobile).

Further, preferably, the device further comprises a bird's-eye view photographed image generation section for generating a bird's-eye view photographed image of the vehicle periphery from a plurality of photographed images covering the periphery of the vehicle and having different photographing directions, with using projection transformation; and the image synthesis section applies the substitute image to the 3D object image area of the bird's-eye view photographed image. In this, with a peripheral bird's-eye view image obtained by a projection transformation processing using an upper viewpoint, if the 3D object is present in front of the camera, there occurs a distortion of the top portion of the 3D object being elongated. For this reason, with the addition of the substitute image as provided by the above-described configuration, it is possible to make correction for better visibility of the 3D object.

MODES OF EMBODYING THE INVENTION

1. First Embodiment

Figure 1:
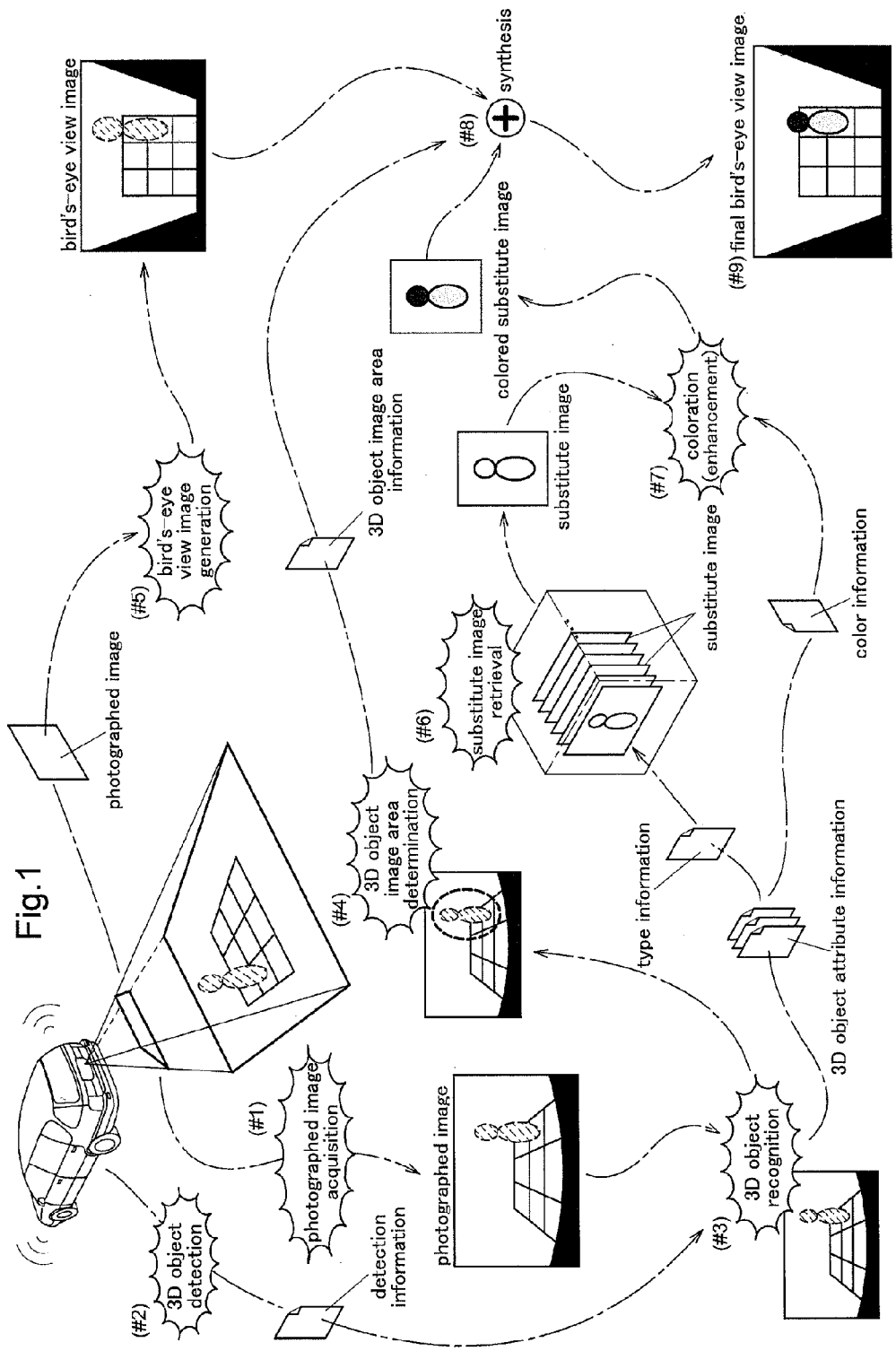
FIG. 1 is a schematic diagram illustrating the basic concept relating to the first embodiment of the present invention in which a 3D object image is substituted by a substitute image and a color is added to the substitute image.

Firstly, if a recognized 3D (three-dimensional) object is included in a photographed image of an in-vehicle camera, a bird's-eye view image comprising a 3D object image substituted by a substitute image is produced. Now, the basic concept of a bird's-eye view image producing process relating to the first embodiment of the present invention will be explained with reference to the schematic diagram of FIG. 1. For the sake of simplicity of the explanation, there is illustrated production of a bird's-eye view image using only a photographed image of a rear camera as an in-vehicle camera. In general, however, a bird's-eye view image of vehicle periphery centering about the vehicle will be produced from photographed images from front and rear cameras and left and right side cameras.

For monitor displaying of a bird's-eye view image as a vehicle periphery monitoring screen, firstly, a photographed image of the peripheral area of the self vehicle along its traveling direction is obtained by the in-vehicle camera (#1). Here, an obtained photographed image is utilized also for a detection process of a 3D object which constitutes an "obstacle" present in the vehicle periphery. For the detection of a 3D object, a standard image recognition processing is employed. Secondarily, there is employed a 3D object detection utilizing an ultrasonic wave, a laser radar technique, infrared beam technique (#2). The 3D object recognition algorithm is well-known, thus will not be detailed herein. Briefly, however, a 3D object is recognized by such technique as determination whether the object is moving or stationary with use of the motion vector technique or the difference method, shape determination through detection of size, edge, type specification based on color information. Further, as used in FIG. 1, after detection of a 3D object with using an ultrasonic wave or laser radar, based on this detection information, the 3D object may be recognized in greater details through image recognition using a photographed image. Through this image recognition, there are generated 3D object attribute information including 3D object attribute values such as the position, directional posture, size, type, color of the 3D object present within the photographic view of the in-vehicle camera (#3). Moreover, based on the position information included in the 3D object attribute information, there is determined a 3D object image area which is the image area of the 3D object in the photographed image (#4).

On the other hand, from the photographed image of the rear camera, in this example, there is effected a projection transformation with a projection plane being set as a plane parallel with the road surface, that is, a viewpoint transformation with setting a virtual viewpoint immediately above (#5). Through this first projection transformation process, there is obtained a bird's-eye view image of the vehicle periphery as a bird's-eye view image immediately above of the photographed image. Incidentally, this 3D image area can be determined from the position information included in the 3D object attribute information, not only for the photographed image, but also for the above bird's-eye view image.

In the periphery bird's-eye view image obtained by the projection transformation process using the upper viewpoint, in case the 3D object is present in front of the camera, there occurs distortion of the top portion of the 3D object being elongated. For this reason, as will be explained below, for the 3D object image area, there is effected a correction for better visibility of the 3D object, through a synthesis process such as an overwriting or superposing process of substituting by a substitute image.

Firstly, for generation of a substitute image to be applied to the 3D object image area, a substitute image which constitutes its basis is retrieved from a substitute image database (#6). This substitute image database stores therein substitute images of 3D objects that can be present in a vehicle periphery in such a manner that they can be recognized by this system, according to type information, moving/stationary object information, size information, included in 3D object attribute information, as search conditions, so that the objects can be retrieved therefrom using the search condition.

A substitute image retrieved from the substitute image database is colored based on color information included in the 3D object attribute information (#7). This coloration of a substitute image can be effected in various patterns. For instance:

(1) The color exhibited by the 3D object in the photographed image can be used directly.

(2) If the specified 3D object has a characteristic color, this characteristic color can be used. For instance, a single red color can be used for a mailing box. A single green color can be used for a tree. In the case of a human object, two colors can be used, one for the upper half of the body, the other for the lower half of the body.

(3) In the case of a moving object, coloration with gradation corresponding to the moving direction can be used.

(4) In case a plurality of colors are included, the average color thereof as a single color can be used.

(5) The 3D object can be divided into a plurality of areas along the height direction or the horizontal direction relative to the road surface. And, the substitute image can be colored separately with average colors or representative colors of the respective areas.

The colored substitute image is placed in alignment with the 3D object image area in the periphery bird's view image and synthesized with the bird's-eye view image (#8). In this synthesis, for size agreement between the 3D object image area and the substitute image, there will be effected, if necessary, an expansion or contraction process of the substitute image. Further, in order to make less conspicuous the border between the substitute image and the bird's-eye view image to be synthesized therewith, the area around the border will be subject to a suppression process such as blurring, blending with periphery pixels (α blending, etc.), brightness reduction, etc.

The resultant final bird's-eye view image integrated with the substitute image by the synthesis process is transmitted to a monitor and displayed on the monitor for the purpose of vehicle periphery monitoring (#9).

Figure 2:
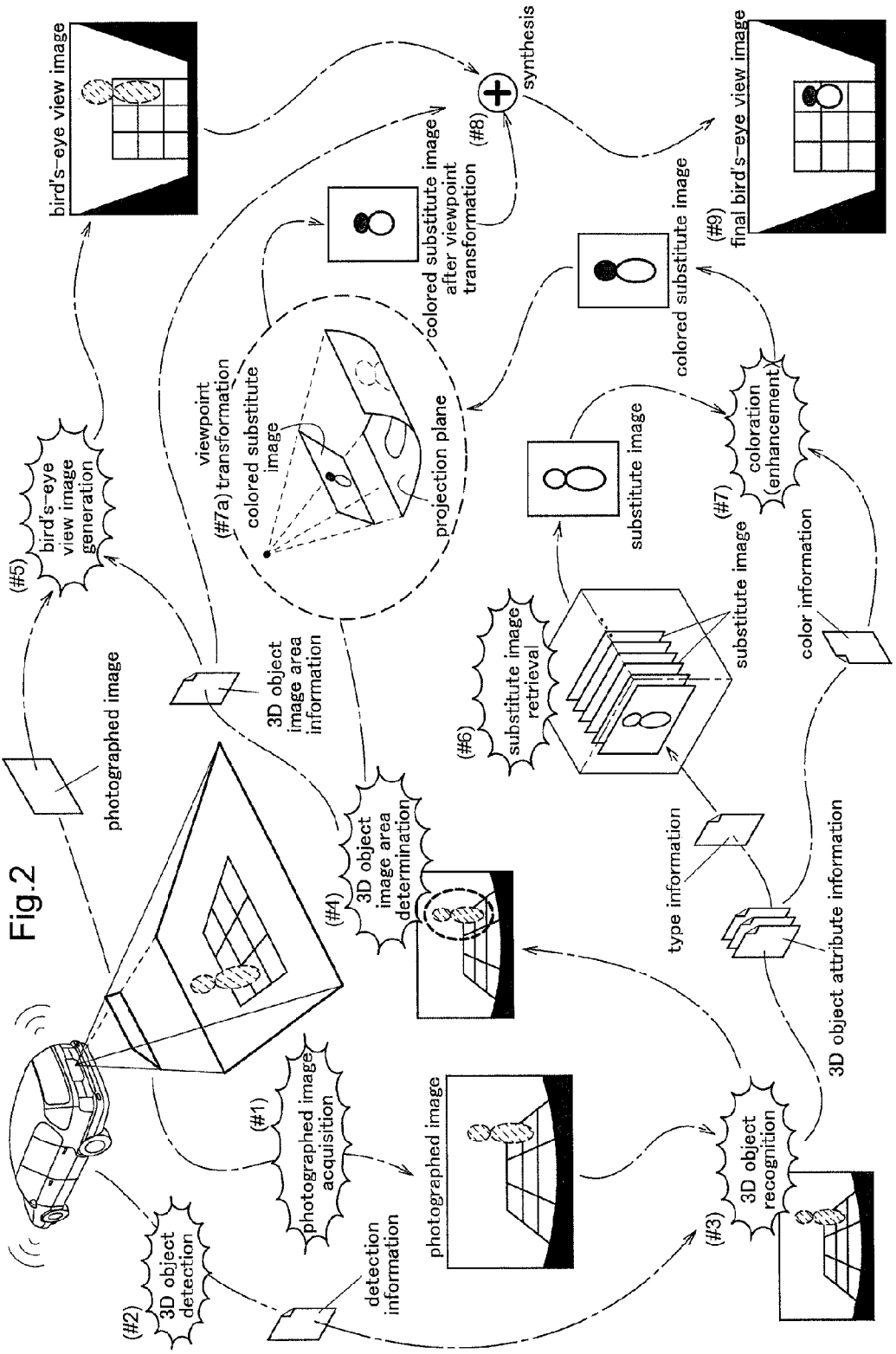
FIG. 2 is a schematic diagram showing an arrangement with an addition to the arrangement of FIG. 1 in which a substitute image too is subjected to a projection transformation.

FIG. 2, like FIG. 1, is a schematic diagram for explaining the basic concept of the present invention. The difference of this concept from the basic concept illustrated in FIG. 1 is that a substitute image too is subject to a viewpoint transformation process and then synthesized with a bird's-eye view image. A substitute image stored and registered in the substitute image database is also a 3D object image created from a predetermined viewpoint. However, depending on the image position for its synthesis in the bird's-eye view image, there can occur a feeling of wrongness that cannot be ignored. In order to avoid this problem, the substitute image is subject to a viewpoint transformation process for eliminating such feeling of wrongness determined according to the image position to be synthesized, the type of 3D object, etc. (#7a).

Instead of such technique for avoiding feeling of wrongness through a viewpoint transformation, it is possible to employ a different technique as follows. In this, a colored substitute image is synthesized with a photographed image prior to its viewpoint transformation to the bird's-eye view image, then, the synthesized photographed image is subject to viewpoint transformation, thus generating a bird's-eye view image including the colored substitute image, which bird's-eye view image is then transmitted to the monitor.

Figure 3:
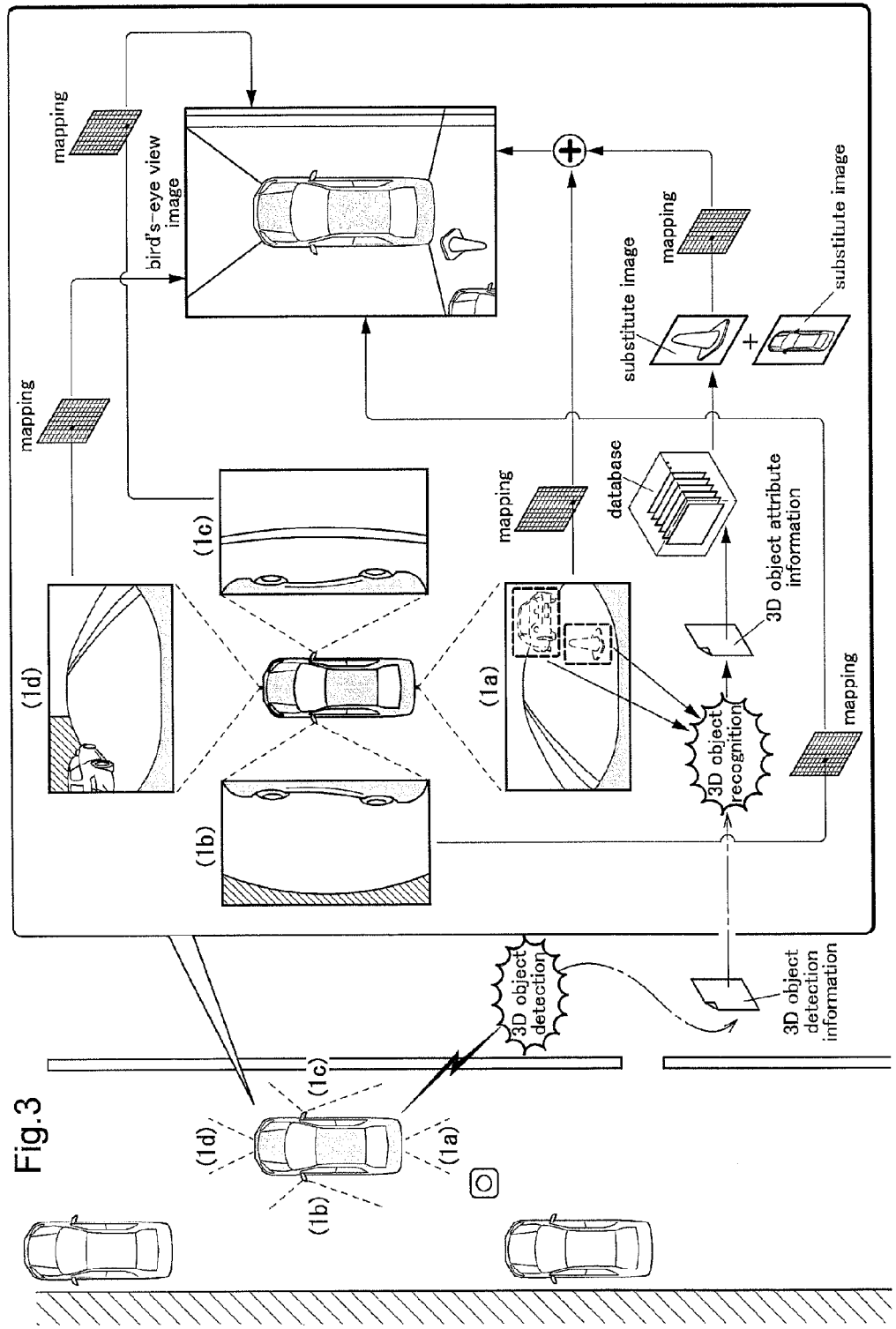
FIG. 3 is a schematic diagram showing an example wherein a substitute image relating to the first embodiment is applied to a bird's-eye view image using front, rear, right and left four photographed images.

In the case of the basic concepts diagrams of FIG. 1 and FIG. 2, the final bird's-eye view image for monitor displaying is generated with using only a photographed image from the rear camera. However, for better grasping of the peripheral condition around the self vehicle in four directions, in particular, the road surface condition, a whole-periphery bird's-eye view image is effective. FIG. 3 is a basic concept diagram illustrating a procedure for generating such whole-periphery bird's-eye view image including colored substitute images including a 3D object in the photographed images, from four photographed images from a rear camera 1a, left and right side cameras 1b, 1c, and a front camera 1d.

FIG. 3 illustrates a generation procedure of a whole-periphery bird's-eye view image to be displayed on a monitor for parking assistance in the case of a parallel parking by reverse driving. Incidentally, in this example, it is assumed that a road cone as a 3D object of interest is present in a photographed image of the rear camera 1a. A rear photographed image obtained by the rear camera 1a is subject to a projection transformation as a rear area image of the whole-periphery bird's-eye view image from immediately above the vehicle. Similarly, a left photographed image obtained by the left side camera 1b, a right photographed image obtained by the right side camera 1c and a front photographed image obtained by the front camera 1d are subject to projection transformation as a left area image, a right area image and a front area image of the whole-periphery bird's-eye view image, respectively. In these, each projection transformation is effected with using a mapping table. And, since values of each map data are different, there is set a map suitable respectively. However, each of these maps is configured to realize a projection transformation that uses a plane parallel with the road surface as the projection plane.

Of the four in-vehicle cameras, the rear photographed image from the rear camera 1a includes the 3D object (a road cone in this example). The presence of this 3D object is detected by a 3D object detection function included in the vehicle and is recognized by an image recognition technique from the photographed image photographing the peripheral area including this 3D object. Then, 3D object attribute information including position information, type information, color information, etc. of the recognized 3D object is outputted in such a manner as to be linkable with the photographed image (rear photographed image) from the rear camera 1a. Therefore, based on the position information included in the 3D object attribute information, the area showing the 3D object in the rear area image will be determined as the 3D object image area.

Further, with using the type information, the size information etc. included in the 3D object attribute information as search condition, there is retrieved a substitute image for the 3D object (the road cone and a portion of the vehicle) included in the rear area image. Then, this retrieved substitute image is colored based on the color information included in the 3D object attribute information. In doing this, since the color information is based on the pixel values of the image of the recognized 3D object in the photographed image, the information is susceptible to influences of the light of the environment, etc. Although coloring with such natural color may be favorable depending on the 3D object, in general, better visibility can be obtained with coloration with an enhanced color. In this particular case, even when the color information of the road cone is a yellowish dark color, the visibility of the road cone can be improved by coloring with a yellow color having high brightness. Then, the colored substitute image composed of the colored road cone and vehicle portion is synthesized with the rear bird's-eye view image. In this, the synthesis may be effected after forming the colored substitute image into the bird's-eye view image with using the viewpoint transformation mapping table that has generated the rear bird's-eye view image or an optimum viewpoint transformation mapping table for further bettering the colored substitute image (the road cone and the vehicle portion).

Further, preferably, in the rear area image (rear bird's-eye view image segment) in the whole-periphery bird's-eye view image synthesized with the outputted colored substitute image, a suppression process is effected on the previously determined 3D object image area. In addition to the rear bird's-eye view image segment containing the colored substitute image generated in the manner described above, a left bird's-eye view image segment, a right bird's-eye view image segment and a front bird's-eye view image segment will also be synthesized and finally a whole-periphery bird's-eye view image to be monitor-displayed will be generated. Needless to say, the synthesis of the colored substitute image can be effected later on a previously generated whole-periphery bird's-eye view image.

Next, a first embodiment of the present invention will be explained with reference to the accompanying drawings. In this embodiment, as illustrated in FIG. 3, an image generation device for generating a whole-periphery bird's-eye view image from photographed images from the four in-vehicle cameras, i.e. the rear camera 1a, the front camera 1d, the left side camera 1b, the right side camera 1c and 3D object detection information is incorporated within a vehicle for constructing a vehicle periphery monitoring system. In the following explanation, these in-vehicle cameras 1a, 1b, 1c, 1d may be generically referred to as "the camera 1" for the sake of convenience. When the vehicle periphery monitoring is operative, a photographed image obtained by the camera 1 or a bird's-eye view image generated with using this photographed image will be displayed on a monitor.

Each camera 1 is a digital camera configured to photograph over time from 15 to 30 frames per second of two-dimensional images with using imaging devices, such as CCD (charge coupled device) or CIS (CMOS image sensor) and effect digital conversion of these images and output them in real time. The camera 1 is comprised of a wide-angle lens. In particular, in the instant embodiment, there is secured a viewing angle from 140 to 190 degrees in the horizontal direction and the camera 1 is mounted in the vehicle with an optical axis having about 30 degrees depression angle.

Figure 4:
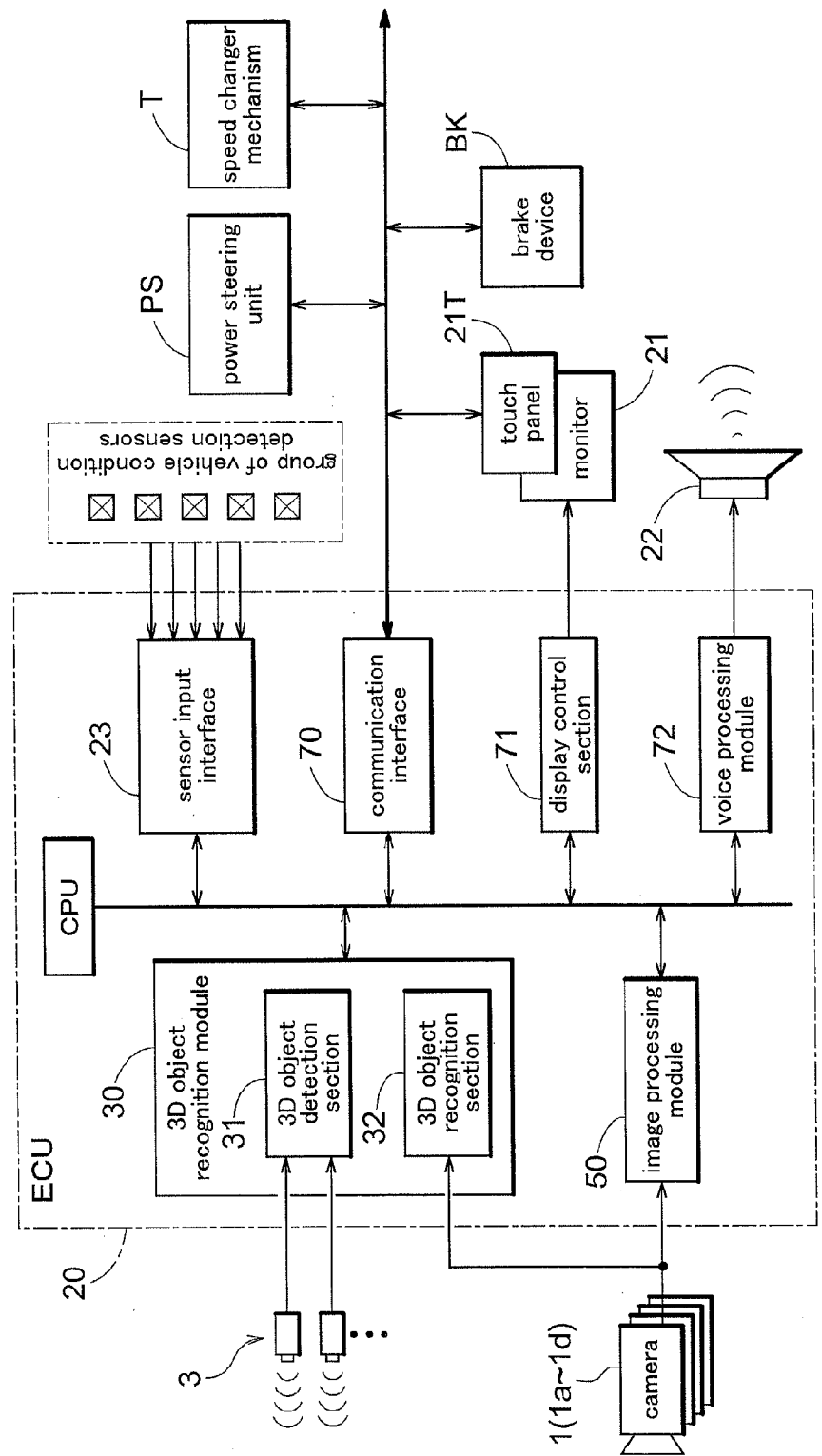
FIG. 4 is a functional block diagram of a vehicle periphery monitoring system to which an image generation device relating to the first embodiment of the present invention is applied.

Inside the vehicle, there is mounted an ECU 20 which constitutes the core of the vehicle periphery monitoring system. This ECU 20, as shown in FIG. 4, includes a sensor input interface 23 for transmitting signal inputs from a group of vehicle condition detection sensors as they are or with evaluations thereof to the inside of the ECU 20, a communication interface 70, etc. as well as a microprocessor for processing input information, a DSP (digital signal processor), etc.

The group of vehicle condition detection sensors connected to the sensor input interface 23 detect various conditions relating to driving operation and traveling of the vehicle. Though not shown, the vehicle condition detection sensor group includes a steering sensor for determining direction (steering direction) and operation amount (steering amount), a shift position sensor for determining the shift position of a shift lever, an accelerator sensor for determining an operation amount of an accelerator pedal, a brake sensor for detecting an operation amount of a brake pedal, a distance sensor for detecting a traveling distance of the self vehicle.

Further, the communication interface 70 used as an input/output interface employs an in-vehicle LAN as a data transmission network and to this interface 70, there are connected control units for a monitor 21, a touch panel 21T, a power steering unit PS, a speed changer mechanism T, a brake device BK, etc. to be capable of transmitting data thereto. In addition, as an output device for voice information, there is provided a speaker 22.

Further, the ECU 20 includes various functional units/sections which are realized in the form of hardware and/or software. As such functional units relating in particular to the present invention, there can be cited a 3D (three-dimensional) object recognition module 30, an image processing module 50, a display control section 71, and a voice processing module 72. A monitor displaying image generated by the image processing module 50 is converted into video signals by the display control section 71 and transmitted as such to the monitor 21. A voice guide or an alarm sound for emergency generated by the voice processing module 72 will be outputted via the speaker 22.

The 3D object recognition module 30 includes a 3D object detection section 31 for effecting a 3D object detection through evaluation of detection signals from a plurality of ultrasonic sensors 3 and a 3D object recognition section 32 for effecting 3D object recognition with using photographed images from the in-vehicle cameras 1. The ultrasonic sensors 3 are mounted respectively at opposed end portions and center portions of the front portion, the rear portion, the left side portion and the right side portion of the vehicle, so that an object (obstacle) present near the vehicle periphery can be detected through reflected waves from these sensors. More particularly, through processing return time and amplitude of the reflected wave of each ultrasonic sensor 3, the distance from the vehicle to the object and the size of the object can be surmised. Also, through chronological processing of the detection results of all the ultrasonic sensors 3, it is also possible to surmise the movement of the object as well as its outer shape in the lateral direction. The 3D object recognition section 32 incorporates an object recognition algorithm which per se is known and can recognize a 3D object present in the vehicle periphery from inputted photographed images, in particular, chronologically continuous series of photographed images. For the detection of 3D object, only one of the 3D object detection section 31 and the 3D object recognition section 32 may be employed. However, through cooperative operation of the 3D object recognition section 32 effective for detection of the shape of a 3D object and the 3D object detection section 31 effective for detection of the distance to a 3D object, that is, the position of the 3D object, more accurate 3D object recognition is made possible. The 3D object recognition module 30 outputs 3D object attribute information describing the position, directional posture, color tone of the recognized 3D object. As the 3D object detection section 31, a different 3D object detection device using laser radar or the like may be employed.

Figure 5:
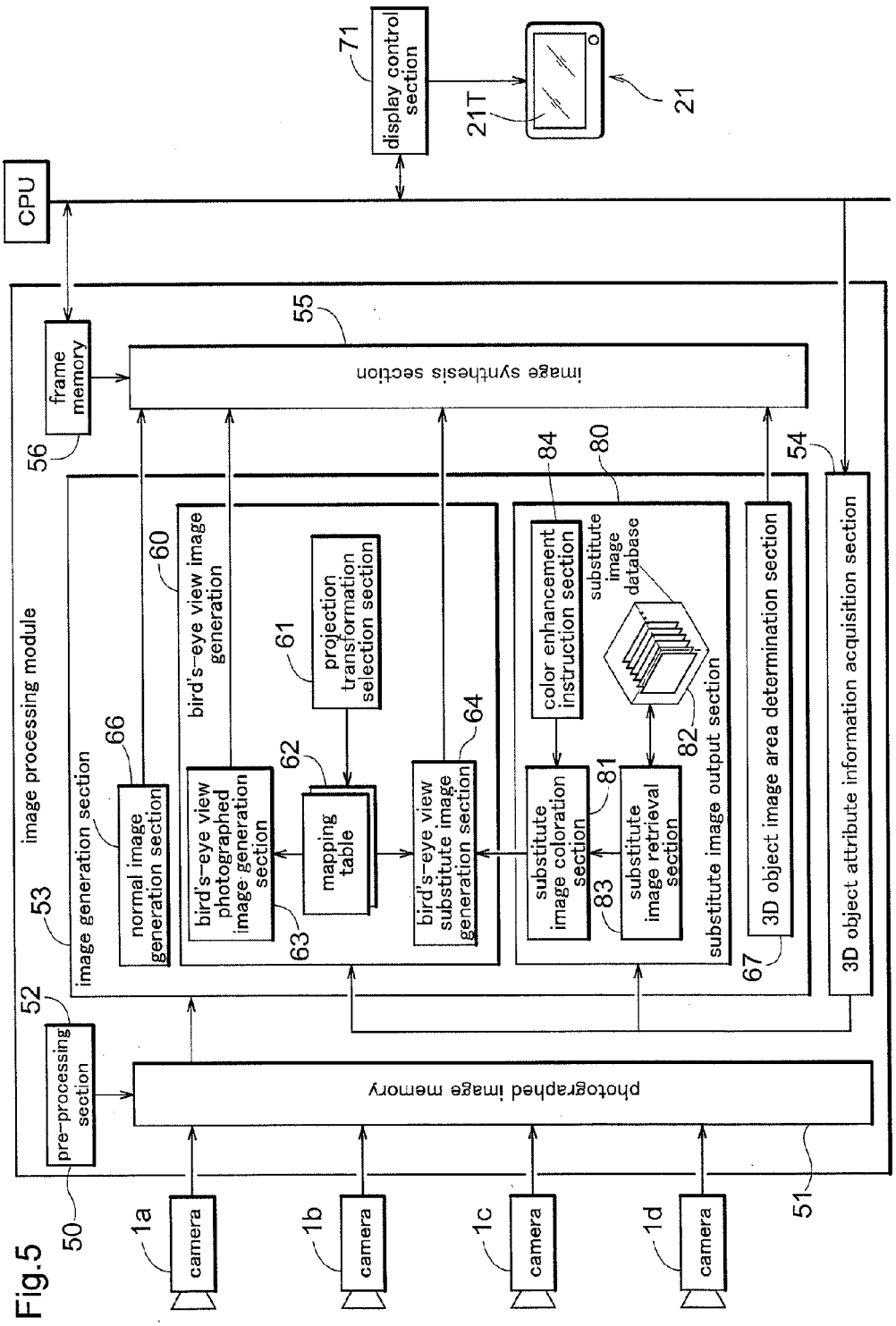
FIG. 5 is a functional block diagram of an image processing module constituting the vehicle periphery monitoring system relating to the first embodiment.

FIG. 5 shows a functional block diagram of the image processing module 50 included in the ECU 20. This image processing module 50 is configured to generate an image such as a bird's-eye view image transformed by a projection transformation from a photographed image obtained by a camera 1 photographing the vehicle periphery.

The image processing module 50 includes a photographed image memory 51, a pre-processing section 52, an image generation section 53, a 3D object attribute information acquisition section 54, an image synthesis section 55 and a frame memory 56. In operation, photographed images obtained by the cameras 1 are mapped in the photographed image memory 51 and the pre-processing section 52 adjusts brightness balance, the color balance, etc. among the photographed images obtained individually by the cameras 1. The 3D object attribute information acquisition section 54 receives the 3D object attribute information outputted from the 3D object recognition module 30 and reads out various kinds of attribute information (data) such as the position, size, color, directional posture or the like the 3D object described in this 3D object attribute information.

The image generation section 53 includes a bird's-eye view image generation section 60, a substitute image output section 80, a normal image generation section 66, and a 3D object image area determination section 67. The normal image generation section 66 adjusts a photographed image to an image suitable to be monitor-displayed as a vehicle periphery image. The vehicle periphery image to be monitor-displayed as a vehicle periphery image can be an image selected by the driver from the photographed images obtained by the rear camera 1a, the left and right side cameras 1b, 1c, the front camera 1d or a desired combination of a plurality of photographed images. The 3D object image area determination section 67 determines an image area for a 3D object in the photographed image, based on the position information of the recognized 3D object included in the 3D object attribute information from the 3D object attribute information acquisition section 54. In this, a 3D object image area can be determined for a photographed image or a bird's-eye view image or both of these.

The bird's-eye view image generation section 60 includes a bird's-eye photographed image generation section 63 for generating a bird's-eye view image through a viewpoint transformation process from one or a plurality of photographed image(s) mapped in the photographed image memory 51. In this embodiment, the section 60 further includes a bird's-eye substitute image generation section 64 for generating a bird's-eye view image through a viewpoint transformation from a substitute image as will be detailed later. Incidentally, in the instant embodiment, the projection transformations effected at the bird's-eye view photographed image generation section 63 and the bird's-eye view substitute image generation section 64 are realized through map transformation using a mapping table. Therefore, there are selectively stored in advance various mapping tables for projection transformations used here. An individual mapping table or a group of a plurality of mapping tables selectively stored as described above is referred to herein as the mapping table 62. Each mapping table (will be referred to simply as "a map" hereinafter) constituting the mapping table 62 can be configured in many ways. In this embodiment, they are configured as a map describing correlation between pixel data of a photographed image and pixel data of projection transformed image (normally, bird's-eye view photographed image) and a map describing correlation between pixel values of a substitute image and pixel values of projection transformed image. In particular, for each pixel of one frame of photographed image, there is described a destination pixel coordinate in the bird's-eye view photographed image. And, for each in-vehicle camera, a different map will be applied. The projection transformation selection section 61 selects, for the bird's-eye view substitute image generation section 64, a projection transformation that best matches a bird's-eye view photographed image, based on attributes read out of the 3D object attribute information.

In the bird's-eye view substitute image generation section 64 too, there are set a plurality of kinds of projection transformations. The selection of a projection transformation to be effected at the bird's-eye view substitute image generation section 64 is effected by the projection transformation selection section 61, based on the type of the substitution object (3D object), the type of the projection transformation (viewpoint position) of the photographed image (bird's-eye view image) as the source for synthesis.

Incidentally, the bird's-eye view substitute image generation section 64 has a further function of outputting an inputted substitute image as it is.

A substitute image output section 80 includes a substitute image retrieval section 83, a substitute image database 82, a substitute image coloration section 81, and a color enhancement instruction section 84. The substitute image database 82 registers and stores therein, as substitute images, images (photos, illustrations, etc.) created in advance respectively for various possible forms of 3D objects that can be recognized by the 3D object recognition section 32, for instance, in the case of a human, images thereof respectively for a child, an adult, a female, a male, its directional posture, etc. in such a manner that they are selectable by the search conditions. The substitute image retrieval section 83 retrieves from the substitute image database a substitute image of a 3D object recognized by the 3D object recognition section 32, based on 3D object type information included in the 3D object attribute information. Further, based on color information included in the 3D object attribute information, a retrieved substitute image is colored by the substitute image coloration section 81. The manner of coloration can be selected appropriately, depending on the substitute image. For instance, in the case of a human, appropriate colors can be provided to respective coloring areas separately set for the upper body half and the lower body half. Or, the whole image may be painted with an appropriate color entirely. Further alternatively, a suitable color can be provided in advance. Here, a "suitable color" means a color which allows easy identification of the actual 3D object by the driver based on the substitute image added with this color. In the case of a road cone, a suitable color will be orange or yellow provided in advance. In the case of a human, the suitable color will be the color of a jacket or a skirt that can be obtained from a photographed image. A substitute image displayed on a display screen such as a liquid crystal panel will be a small image. So, the color enhancement instruction section 84 gives the substitute image coloration section 81 a color enhancement instruction for enhancing the color to be added to a substitute image for better recognizability of the color. Advantageously, this color enhancement instruction will be given, depending on the type of the 3D object or the degree of danger of the 3D object for vehicle travel (this can be determined based on the distance from the vehicle for instance). Therefore, the instruction should be given based on the 3D object attribute information.

The image synthesis section 55 effects superposing synthesis of superposing a bird's-eye view substitute image generated by the bird's-eye view substitute image generation section 64 on the 3D image area of the bird's-eye view photographed image. The method of this synthesis is not limited to the superposition or overwriting described above. The method of superposing through transparent background can be used instead, for instance. A synthesized bird's-eye view image with a substitute image will be transmitted as a displaying image to the frame memory 56 to be displayed on the screen of the monitor 21 as a display screen via the display control section 71.

Figure 6:
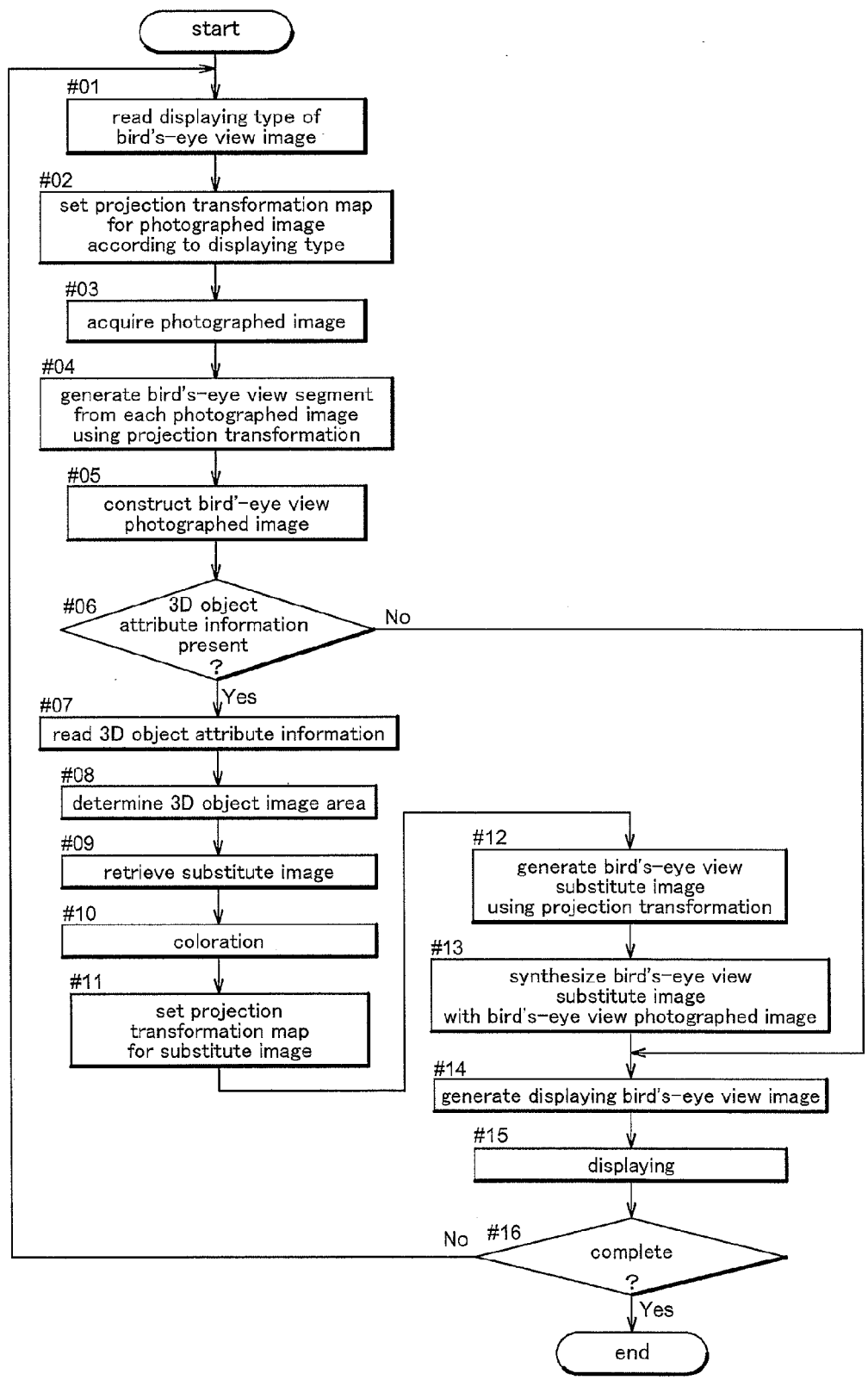
FIG. 6 is a flowchart illustrating the flow of control for displaying a bird's-eye view image in which a 3D object image is substituted by the substitute image relating to the first embodiment.
Figure 7:
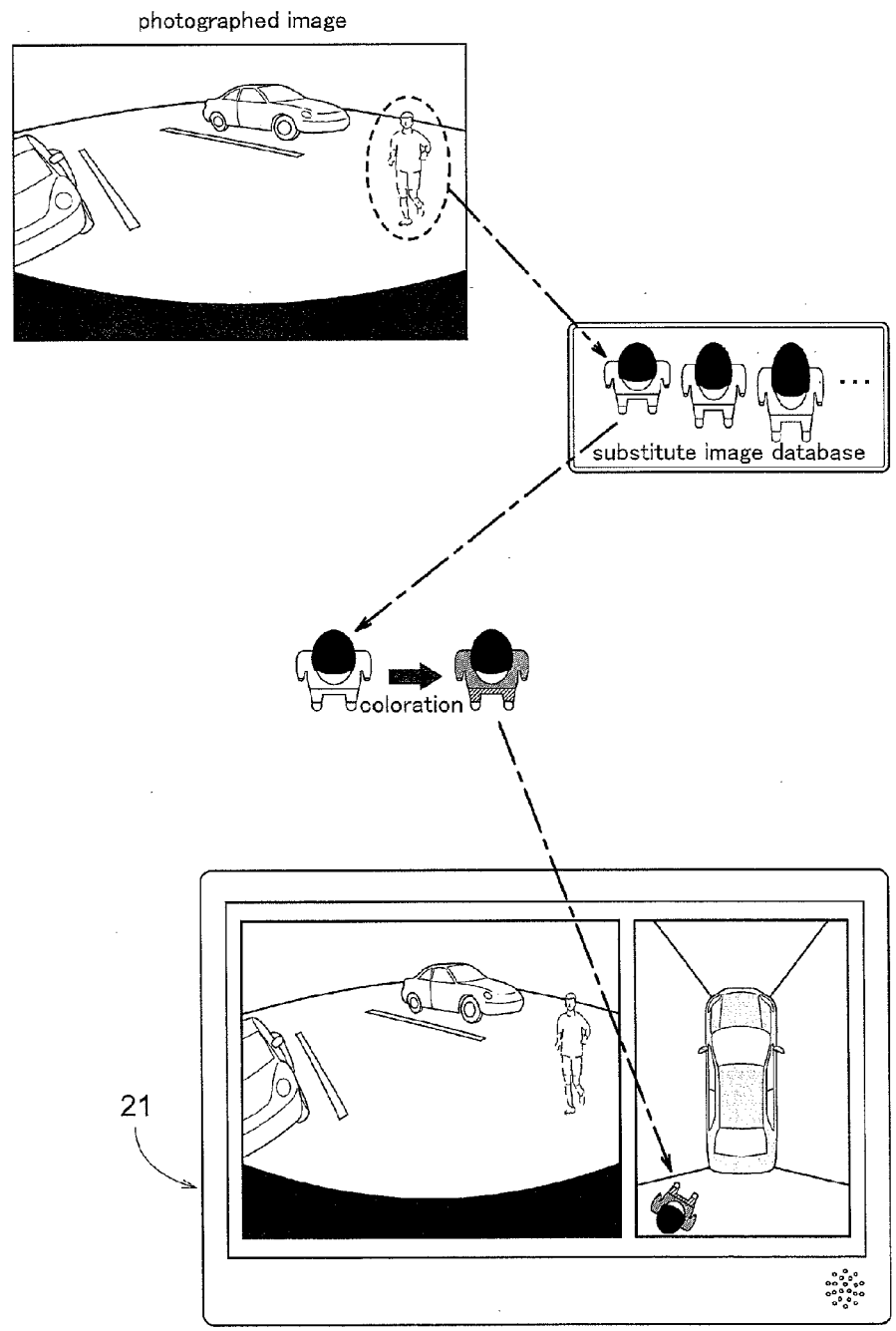
FIG. 7 is a schematic diagram illustrating a process of displaying the bird's-eye view image comprising a 3D object image substituted by a substitute image relating to the first embodiment.

Next, the flow of bird's-eye view image displaying by the vehicle periphery monitoring system incorporating the image generation device configured as described above will be explained with using the flowchart in FIG. 6 and the explanatory view in FIG. 7.

Upon start of a bird's-eye view image displaying routine for the purpose of vehicle periphery monitoring, firstly, there is read out the displaying type of a bird's-eye view image which has been manually set by the driver's desire or set as a default setting (#01). Here, the displaying type of a bird's-eye view image is provided for defining photographed images, the position of the virtual viewpoint for use in generation of the bird's-eye view image of the vehicle periphery, the layout of the generated bird's-eye view image on the monitor screen, etc. A map for projection transformation for use by the bird's-eye view photographed image generation section 63 in accordance with the displaying type of the read bird's-eye view image will be set for each photographed image of the in-vehicle camera 1 to be used (#02). Photographed images of the four in-vehicle cameras 1 are acquired (#03). With using the set map, a bird's-eye view image segment is generated from each photographed image (#04). The resultant generated bird's-eye view image segments are combined and a bird's-eye view image (this can be an illustration, a symbol) of the vehicle set in advance of the position of the self vehicle is disposed and a bird's-eye view image for displaying is generated (#05).

Then, the process checks whether 3D object attribute information is being outputted from the 3D object recognition module 30 or not (#06). If no 3D object attribute information is being outputted (NO branching at #06), it is determined that no 3D object of interest is included in any of the photographed images, and the bird's-eye view photographed image generated at step #05 is used as it is to generate a display bird's-eye view image (#14). This generated display bird's-eye view image is displayed on the monitor 21 (#15). And, unless ending instruction for this bird's-eye view image displaying routine is present (NO branching at #16), the process returns to step #01 to repeat this routine.

If it is found at the checking at step #06 that 3D object attribute information is being outputted (YES branching at #06), it is determined that a 3D object of interest is included in the photographed images. Then, firstly, data of the position, the type, the directional posture, the size of the recognized 3D object included in the 3D object attribute information are read out (#07). Based on the read data relating to the position of the 3D object, an image area for this 3D object in the bird's-eye view photographed image is determined (#08).

A substitute image of this 3D object to be synthesized in the determined 3D object image area is retrieved with using, as a search condition, information such as the type, the size, the directional posture, etc. included in the 3D object attribute information, and then mapped in the memory (#09). Next, for the substitute image mapped in the memory, the substitute image coloration section 81 colors this image based on the color information included in the 3D object attribute information (#10). As the color information included in the 3D object attribute information is based on pixel values of the 3D object included in the photographed image, it may happen that a color originally characterizing the 3D object is not detected, due to e.g. illumination condition. In this coloring process, if it is determined that such situation as above is present, the color to be added to the substitute image will be enhanced. Alternatively, a contour enhancement process for enhancing the contour of the substitute image may be effected on the substitute image.

For the colored substitute image, an optimal projection transformation is selected, based on the type of the projection transformation effected on the photographed images (viewpoint), and type, directional posture of the 3D object substituted by the substitute image and its mapping data is set in the bird's-eye view substitute image generation section 64 (#11) and the substitute image is subjected to this projection transformation (#12). Needless to say, mapping data for "through process" may be set, so that a substitute image not subjected to at least any projection transformation may be generated. Next, the bird's-eye view substitute image is superposed on the 3D object image area of the bird's-eye view photographed image to be synthesized therewith (#13). The final bird's-eye view image of vehicle periphery thus generated is generated as a displaying bird's-eye view image (#14) and displayed on the monitor 21 (#15).

2. Second Embodiment

Next, a second embodiment will be explained. The basic concept of generation process of bird's-eye view image relating to the second embodiment will be explained with reference to the diagram in FIG. 8. Here, for the sake of simplicity of explanation, there will be shown generation of a bird's-eye view image with using only a photographed image of the rear camera as an in-vehicle camera. In general, however, there will be generated a vehicle periphery bird's-eye view centering about the self vehicle from photographed images of the front and rear cameras and the right and left side cameras.

For monitor displaying of a bird's-eye view image as a vehicle periphery monitoring image, firstly, a photographed image of the periphery area of the self vehicle along its traveling direction is obtained by the in-vehicle camera (#1). Here, the obtained photographed image is utilized also for detection of a 3D object as an obstacle present in the vehicle periphery. For this 3D object detection, there will be employed an ordinary image recognition process. Secondarily, however, there will be utilized a 3D object detection utilizing the ultrasonic wave, laser beam or infrared technique. Algorithm for 3D object recognition is well-known, hence, will not be detailed herein. Briefly, however, a 3D object is recognized by such technique as determination whether the object is moving or stationary with use of the motion vector technique or the difference method, shape determination through detection of size, edge, type specification based on color information. Further, as used in FIG. 8, after detection of a 3D object with using an ultrasonic wave or laser radar, based on this detection information, the 3D object may be recognized in greater details through image recognition using a photographed image. Further, although the subject will be limited in such case, if the 3D object is a vehicle capable of communication with the outside, it is possible to determine the directional posture, the vehicle type, the vehicle color of the 3D object (vehicle) recognized with use of inter-vehicle communication. Further, if the 3D object is a human having a mobile phone, it is also possible to determine that the recognized 3D object is a human based on radio transmission from the mobile phone. Moreover, with use of a face detection algorithm, it is also possible to determine that the 3D object is a human and the directional posture of this human (#2). With use of any one of the above methods or a combination thereof, there are generated 3D object attribute information including 3D object attribute values such as the position, the type, the directional posture, the size, the color, etc. of the 3D object present within the photographic field of view of the in-vehicle camera (#3). Also, based on the position information included in the 3D object attribute information, the process determines a 3D object image area as an image area of the 3D object in the photographed image (#4).

On the other hand, from the photographed image of the rear camera, the process effects a projection transformation with a projection plane being the plane parallel with the road surface, i.e. a viewpoint transformation with setting the virtual viewpoint immediately above (#5). Through this first projection transformation process, there is obtained a bird's-eye view image of the vehicle periphery which is a bird's-eye view image immediately above the photographed image. Incidentally, the 3D object image area can be determined based on the position information included in the 3D object attribute information, not only for the photographed image, but also for its bird's-eye view image.

In the periphery bird's-eye view image obtained by the projection transformation process using the upper viewpoint, in case the 3D object is present in front of the camera, there occurs distortion of the top portion of the 3D object being elongated. For this reason, as will be explained below, for the 3D object image area, there is effected a correction for better visibility of the 3D object, through a synthesis such as an overwriting or superposing process of substituting by a substitute image.

Firstly, a substitute image to be applied to the 3D object image area is retrieved from a substitute image database (#6). This substitute image database stores therein 3D objects that can be present in a vehicle periphery and can be recognized by this system, according to type information, posture information, color information, size information, moving/stationary object information, included in 3D object attribute information, as search conditions, so that the objects can be retrieved therefrom using the search condition. Therefore, in order to retrieve an appropriate substitute image, an access is made to the substitute image database, with using the type information and the directional posture information as the search conditions. In doing this, the directional posture information as a search condition will be rewritten into the directional posture of the 3D object such as the forward facing directional posture, lateral facing directional posture, rearward facing directional posture, in the photographed image to be processed, based on the directional posture information obtained. Then, a substitute image which has been retrieved due to substantial matching of the type and the directional posture of the 3D object with the recognized 3D object will be aligned with the 3D object image area in the bird's-eye view peripheral image and then synthesized with this bird's-eye view image (#8). Incidentally, in this synthesis, for size agreement between the 3D object image area and the substitute image, there will be effected, if necessary, an expansion or contraction process of the substitute image. Further, in order to make less conspicuous the border between the substitute image and the bird's-eye view image to be synthesized therewith, the area around the border will be subject to a suppression process such as blurring, blending with periphery pixels ($\alpha$ blending, etc.), brightness reduction, etc. The resultant final bird's-eye view image integrated with the substitute image by the synthesis process is transmitted to the monitor and displayed on the monitor for the purpose of vehicle periphery monitoring (#9).

Figure 8:
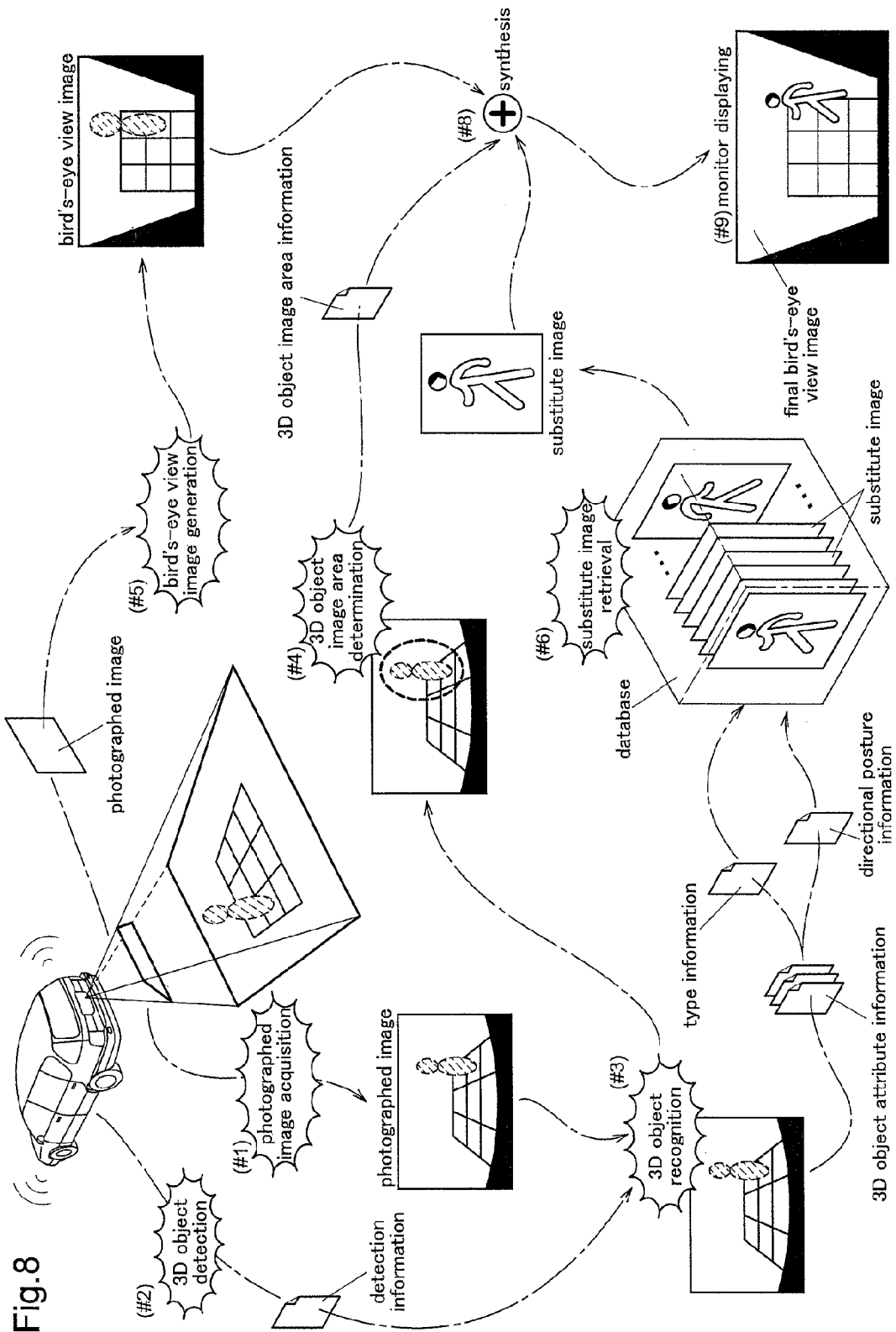
FIG. 8 is a schematic diagram illustrating the basic concept relating to the second embodiment of the present invention in which a 3D object image is substituted by a substitute image and a color is added to the substitute image.
Figure 9:
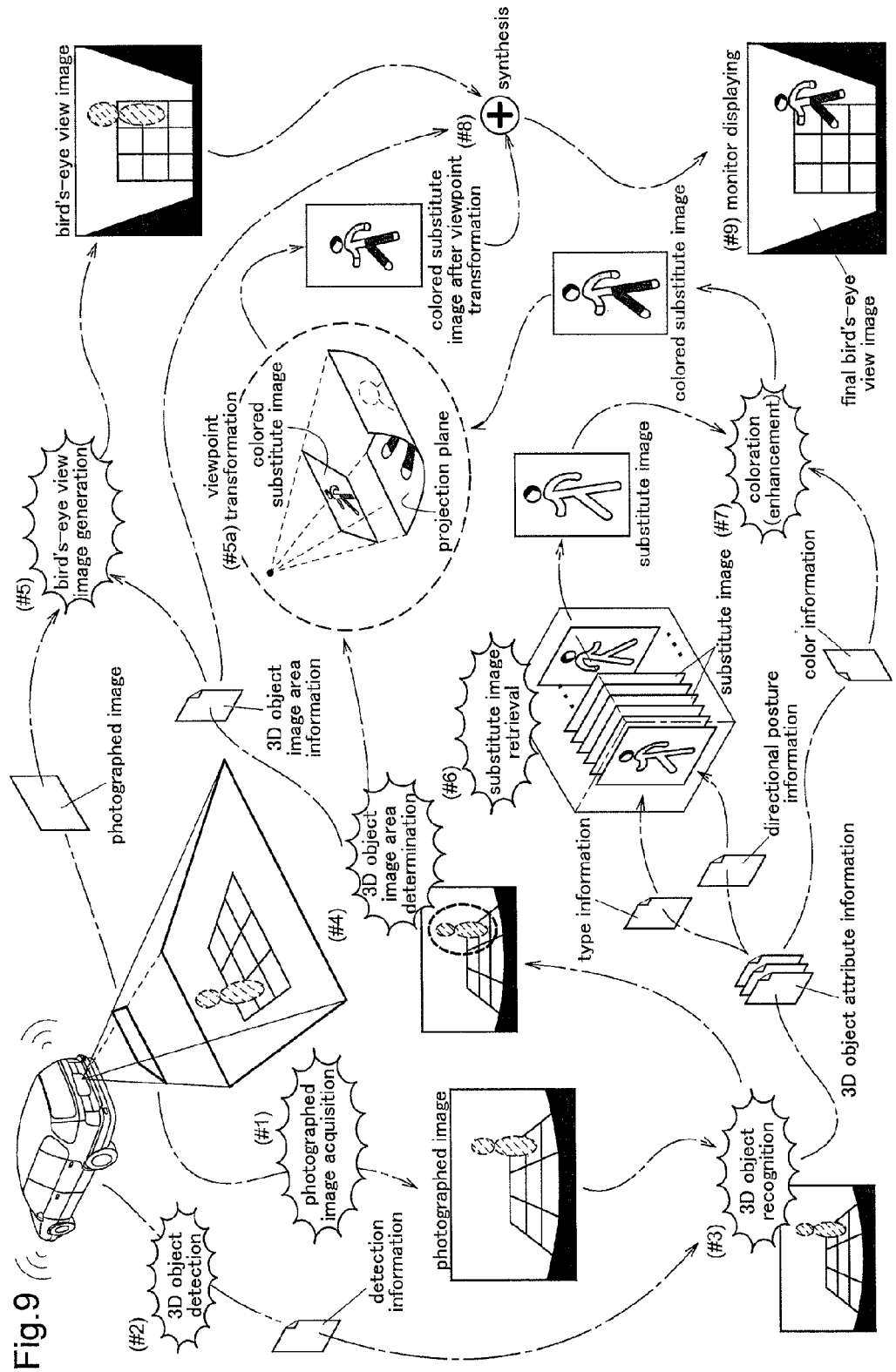
FIG. 9 is a schematic diagram showing an arrangement with an addition to the arrangement of FIG. 8 in which a substitute image too is subjected to a projection transformation.

FIG. 9, like FIG. 8, is a schematic diagram for explaining the basic concept of the present invention. The difference of this concept from the basic concept illustrated in FIG. 8 is that a substitute image too is subject to a viewpoint transformation process and then synthesized with a bird's-eye view image. A substitute image stored and registered in the substitute image database is also a 3D object image created from a predetermined viewpoint. However, depending on the image position for its synthesis in the bird's-eye view image, there can occur a feeling of wrongness that cannot be ignored. In order to avoid this problem, the substitute image is subject to a viewpoint transformation process for eliminating such feeling of wrongness determined according to the image position to be synthesized, the type of 3D object, etc. (#5a).

Instead of such technique for avoiding feeling of wrongness through a viewpoint transformation, it is possible to employ a different technique as follows. In this, a colored substitute image is synthesized with a photographed image prior to its viewpoint transformation to the bird's-eye view image, then, the synthesized photographed image is subject to viewpoint transformation, thus generating a bird's-eye view image including the colored substitute image, which bird's-eye view image is then transmitted to the monitor.

Though as an optional process, in case the 3D object attribute information includes color information and the color according to this color information differs from the color of the retrieved substitute image, or if the retrieved substitute image has no color, a coloring process for applying the color according to the color information to the retrieved substitute image will be effected (#7).

Figure 10:
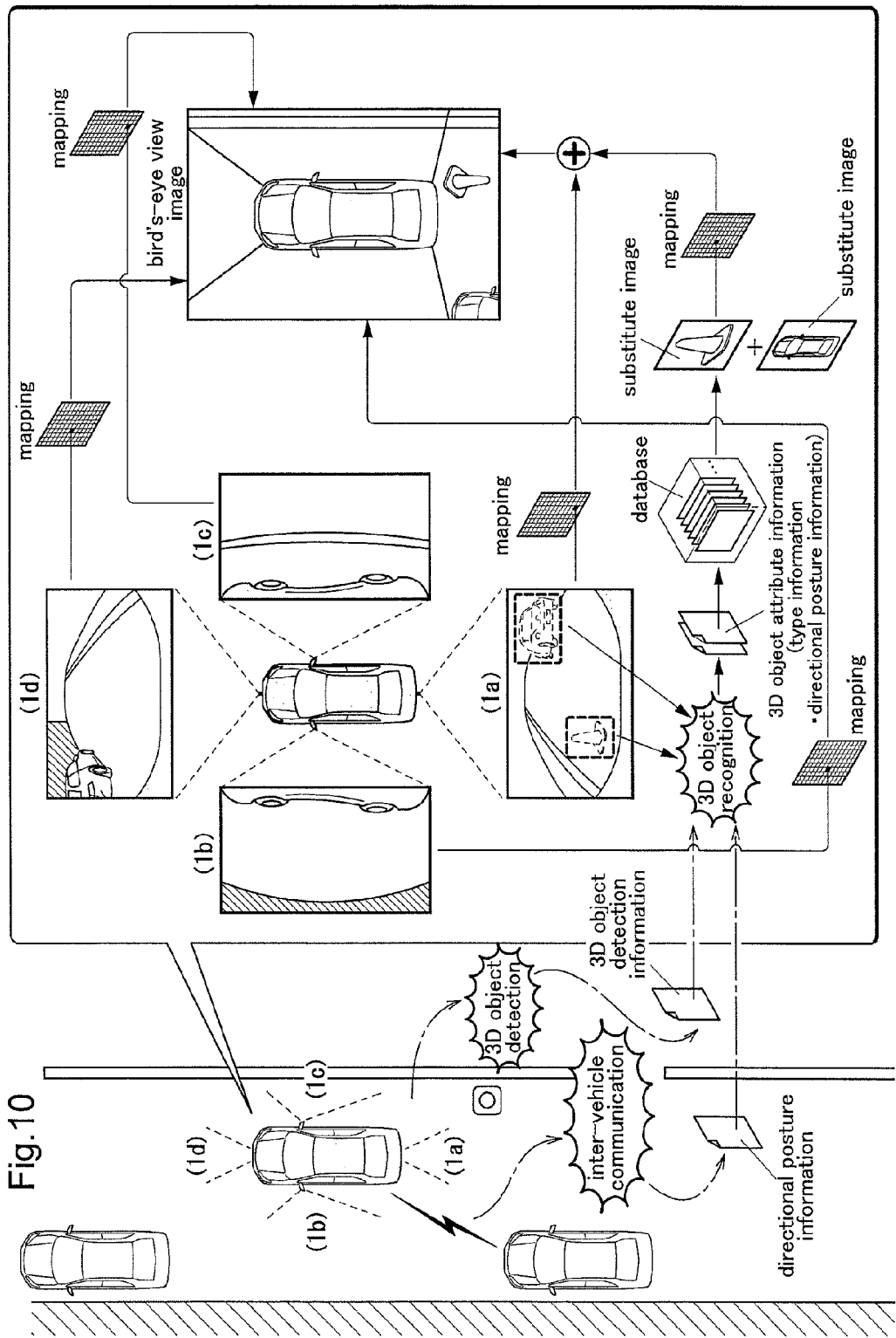
FIG. 10 is a schematic diagram showing an example wherein a substitute image relating to the second embodiment is applied to a bird's-eye view image using front, rear, right and left four photographed images.

In the case of the basic concepts diagrams of FIG. 8 and FIG. 9, the final bird's-eye view image for monitor displaying is generated with using only a photographed image from the rear camera. However, for better grasping of the peripheral condition around the self vehicle in four directions, in particular, the road surface condition, a whole-periphery bird's-eye view image is effective. FIG. 10 is a basic concept diagram illustrating a procedure for generating such whole-periphery bird's-eye view image including colored substitute images of a 3D object included in photographed images, from four photographed images from a rear camera 1a, left and right side cameras 1b, 1c, and a front camera 1d.

FIG. 10 illustrates a generation procedure of a whole-periphery bird's-eye view image to be displayed on a monitor for parking assistance in the case of a parallel parking by reverse driving. Incidentally, in this example, there is assumed that a road cone as a 3D object of interest is present in a photographed image of the rear camera 1a. A rear photographed image obtained by the rear camera 1a is subject to a projection transformation as a rear area image of the whole-periphery bird's-eye view image from immediately above the vehicle. Similarly, a left photographed image obtained by the left side camera 1b, a right photographed image obtained by the right side camera 1c and a front photographed image obtained by the front camera 1d are subject to projection transformation as a left area image, a right area image and a front area image of the whole-periphery bird's-eye view image, respectively. In these, each projection transformation is effected with using a mapping table. And, since values of each map data are different, there is set a map suitable respectively. However, each of these maps is configured to realize a projection transformation that uses a plane parallel with the road surface as the projection plane.

Of the four in-vehicle cameras, the rear photographed image from the rear camera 1a includes the 3D object (a road cone in this example). The presence of this 3D object is detected by a 3D object detection function included in the vehicle and is recognized by an image recognition technique from the photographed image photographing the peripheral area including this 3D object. Further, in case the 3D object is an automobile, it is possible to acquire the vehicle type, directional posture information thereof via inter-vehicle communication. Then, 3D object attribute information including position information, type information, directional posture information, color information, etc. of the recognized 3D object is outputted in such a manner as to be linkable with the photographed image (rear photographed image) from the rear camera 1a. Therefore, based on the position information included in the 3D object attribute information, the area showing the 3D object in the rear area image will be determined as the 3D object image area.

Further, with using the type information, the directional posture information etc. included in the 3D object attribute information as search condition, there is retrieved a substitute image for the 3D object (the road cone and a portion of the vehicle) included in the rear area image, and the retrieved substitute image is synthesized with the rear bird's-eye view image. In this, the synthesis may be effected after forming the colored substitute image into the bird's-eye view image with using the viewpoint transformation mapping table that has generated the rear bird's-eye view image or an optimum viewpoint transformation mapping table for further bettering the colored substitute image (the road cone and the vehicle portion).

Further, preferably, in the rear area image (rear bird's-eye view image segment) in the whole-periphery bird's-eye view image synthesized with the outputted colored substitute image, a suppression process is effected on the previously determined 3D object image area. In addition to the rear bird's-eye view image segment containing the colored substitute image generated in the manner described above, a left bird's-eye view image segment, a right bird's-eye view image segment and a front bird's-eye view image segment will also be synthesized and finally a whole-periphery bird's-eye view image to be monitor-displayed will be generated.

Next, a second embodiment of the present invention will be explained with reference to the accompanying drawings. In this embodiment, as illustrated in FIG. 10, an image generation device for generating a whole-periphery bird's-eye view image from photographed images from the four in-vehicle cameras, i.e. the rear camera 1a, the front camera 1d, the left side camera 1b, the right side camera 1c and 3D object detection information is incorporated within a vehicle for constructing a vehicle periphery monitoring system. In the following explanation, these in-vehicle cameras 1a, 1b, 1c, 1d may be generically referred to as "the camera 1" for the sake of convenience. When the vehicle periphery monitoring is operative, a photographed image obtained by the camera 1 or a bird's-eye view image generated with using this photographed image will be displayed on a monitor.

Each camera 1 is a digital camera configured to photograph over time from 15 to 30 frames per second of two-dimensional images with using imaging devices such as CCD (charge coupled device) or CIS (CMOS image sensor) and effect digital conversion of these images and output them in real time. The camera 1 is comprised of a wide-angle lens. In particular, in the instant embodiment, there is secured a viewing angle from 140 to 190 degrees in the horizontal direction and the camera is mounted in the vehicle with an optical axis having about 30 degrees depression angle.

Figure 11:
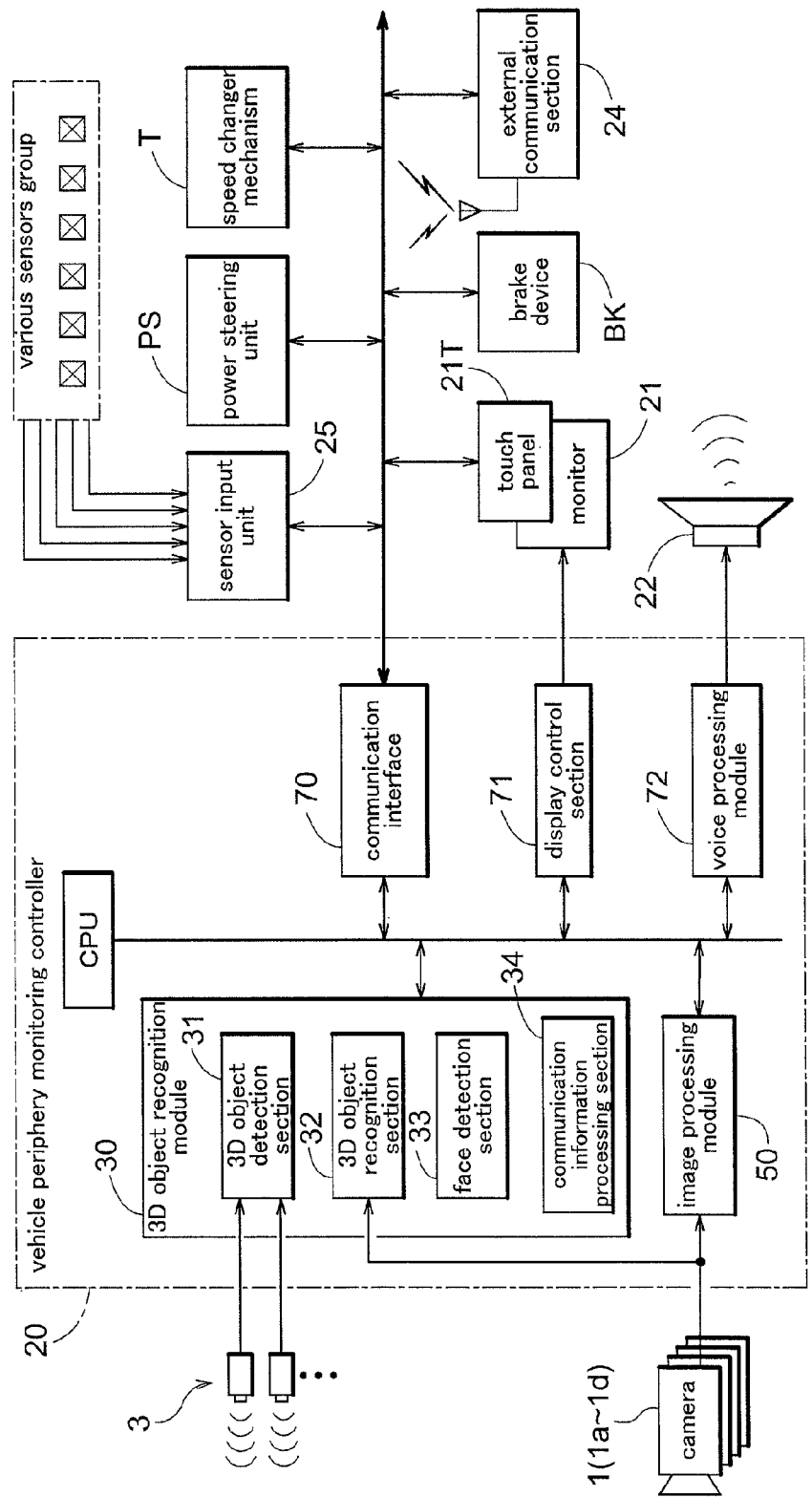
FIG. 11 is a functional block diagram of a vehicle periphery monitoring system to which an image generation device relating to the second embodiment of the present invention is applied.

Inside the vehicle, there is mounted a vehicle periphery monitoring controller 20 which constitutes the core of the vehicle periphery monitoring system. This vehicle periphery monitoring controller 20, as shown in FIG. 11, includes a communication interface 70 used as an in-vehicle LAN interface, as well as a microprocessor for processing input information, a DSP (digital signal processor), etc.

The communication interface 70 employs an in-vehicle LAN as a data transmission network and to this interface 70, there are connected a sensor input unit 25 for transmitting signal inputs from a group of vehicle condition detection sensors as they are or transmitting them with evaluations thereof to the inside of the vehicle periphery monitoring controller 20, an external communication section 24, control units for e.g. a monitor 21, a touch panel 21T, a power steering unit PS, a speed changer mechanism T, a brake device BK, etc. to be capable of transmitting data thereto. In addition, as an output device for voice information, there is provided a speaker 22.

The group of vehicle condition detection sensors connected to the sensor input interface 25 detect various conditions relating to driving operation and traveling of the vehicle. Though not shown, the vehicle condition detection sensor group include a steering sensor for determining direction (steering direction) and operation amount (steering amount), a shift position sensor for determining the shift position of a shift lever, an accelerator sensor for determining an operation amount of an accelerator pedal, a brake sensor for detecting an operation amount of a brake pedal, a distance sensor for detecting a traveling distance of the self vehicle.

The external communication section 24 receives radio waves generated from an external communication instrument and effects e.g. bi-directional transmission or one-directional signal reception of information and transmits received communication information to the in-vehicle LAN. The kinds of communication information relating especially to the present invention are information concerning the vehicle type or directional posture (orientation) of a vehicle present in the periphery (a recognized 3D object) obtained through inter-vehicle communication, information for determining the recognized object being a human through radio intercept of a mobile phone call, etc.

Further, the vehicle periphery monitoring controller 20 includes various functional units/sections which are realized in the form of hardware and/or software. As such functional units relating in particular to the present invention, there can be cited a 3D (three-dimensional) object recognition module 30 for recognizing a 3D object present in the vehicle periphery, an image processing module 50, a display control section 71, and a voice processing module 72. A monitor displaying image generated by the image processing module 50 is converted into video signals by the display control section 71 and transmitted as such to the monitor 21. A voice guide or an alarm sound for emergency generated by the voice processing module 72 will be outputted via the speaker 22.

The 3D object recognition module 30 includes a 3D object detection section 31 for effecting a 3D object detection through evaluation of detection signals from a plurality of ultrasonic sensors 3, a 3D object recognition section 32 for effecting 3D object recognition with using photographed images from the in-vehicle cameras 1, a face detection section 33 and a communication information processing section 34.

The ultrasonic sensors 3 are mounted respectively at opposed end portions and center portions of the front portion, the rear portion, the left side portion and the right side portion of the vehicle, so that an object (obstacle) present near the vehicle periphery can be detected through reflected waves from these sensors. More particularly, through processing return time and amplitude of the reflected wave of each ultrasonic sensor 3, the distance from the vehicle to the object and the size of the object can be surmised. Also, through chronological processing of the detection results of all the ultrasonic sensors 3, it is also possible to surmise the movement of the object as well as its outer shape in the lateral direction. The 3D object recognition section 32 incorporates an object recognition algorithm which per se is known and can recognize a 3D object present in the vehicle periphery from inputted photographed images, in particular, chronologically continuous series of photographed images. For the detection of 3D object, only one of the 3D object detection section 31 and the 3D object recognition section 32 may be employed. However, through cooperative operation of the 3D object recognition section 32 effective for detection of the shape of a 3D object and the 3D object detection section 31 effective for detection of the distance to a 3D object, that is, the position of the 3D object, more accurate 3D object recognition is made possible. The 3D object recognition module 30 outputs 3D object attribute information describing the position, directional posture, size, color tone of the recognized 3D object. As the 3D object detection section 31, a different 3D object detection device using laser radar or the like may be employed.

The face detection section 33 checks whether a face is included in the 3D object image area of the recognized 3D object or not, with using a known face detection algorithm. If it is found that a face is included, the section identifies this 3D object as a human and further surmises the directional posture of the human, as a forward facing directional posture, a lateral facing directional posture, or a rearward facing directional posture, based on the directional posture of the face. Moreover, if no face is detected from the 3D object in case this 3D object has been surmised as a human by another functional section, it is then surmised that this human assumes a lateral facing directional posture.

The communication information processing section 34 receives non-self vehicle information such as the position, the directional posture (directional posture), the vehicle type, the vehicle color of a non-self vehicle present in the periphery obtained via an inter-vehicle communication effected by the external communication section 24. If it is surmised that the surmised 3D object is the non-self vehicle, then, the section determines the surmised 3D object as an automobile and inputs information such as the directional posture (directional posture), the vehicle type, the vehicle color thereof.

The 3D object recognition module 30 compiles the attribute information of the type, the directional posture, the color etc. obtained by the above-described functional units incorporated therein, thus generating 3D object attribute information and outputs this to the image processing module.

Figure 12:
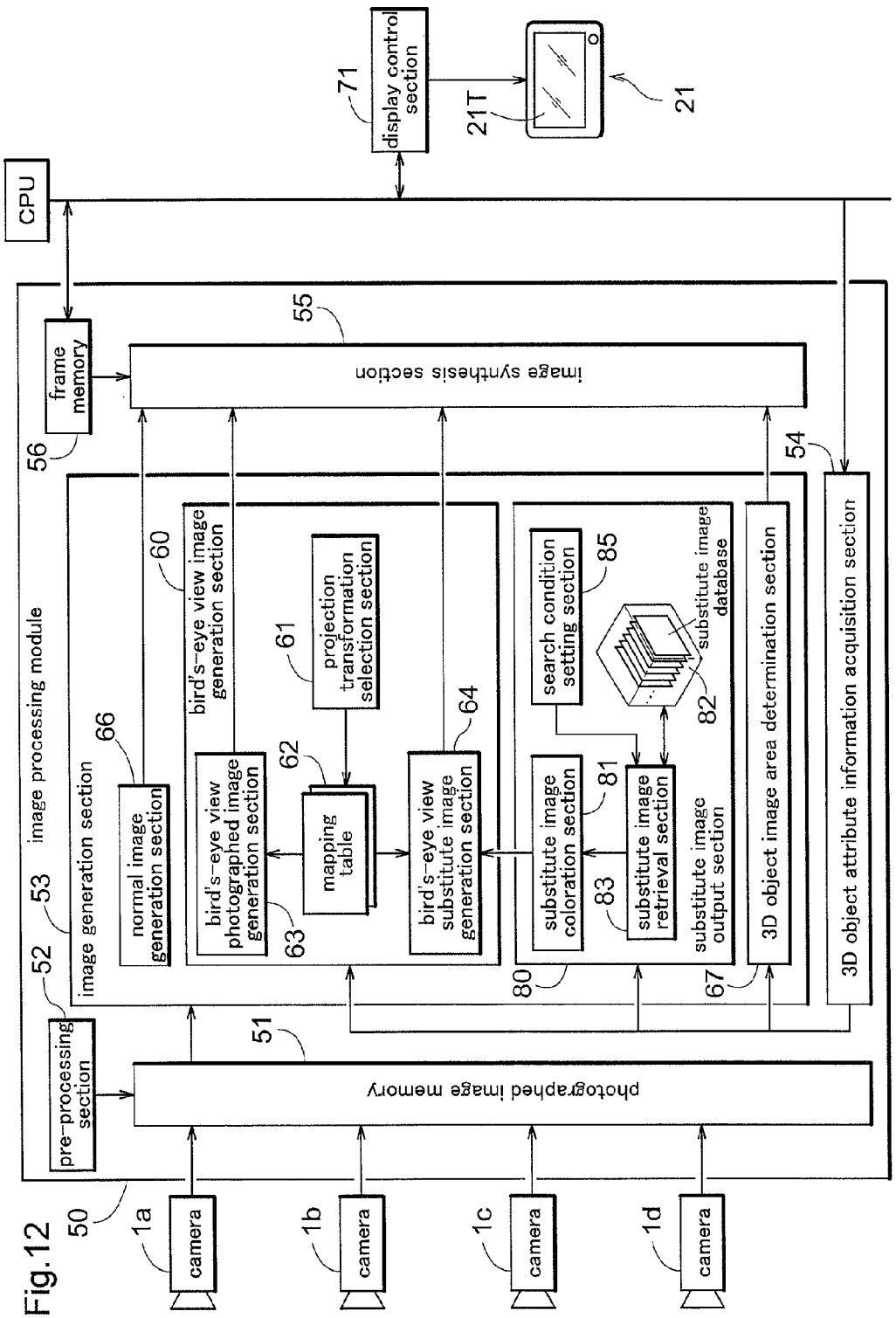
FIG. 12 is a functional block diagram of an image processing module constituting the vehicle periphery monitoring system relating to the second embodiment.

FIG. 12 shows a functional block diagram of the image processing module 50 included in the vehicle periphery monitoring controller 20. This image processing module 50 is configured to generate an image such as a bird's-eye view image transformed by a projection transformation from a photographed image obtained by a camera 1 photographing the vehicle periphery.

The image processing module 50 includes a photographed image memory 51, a pre-processing section 52, an image generation section 53, a 3D object attribute information acquisition section 54, an image synthesis section 55 and a frame memory 56. In operation, a photographed images obtained by the cameras 1 are mapped in the photographed image memory 51 and the pre-processing section 52 adjusts brightness balance, the color balance, etc. among the photographed images obtained individually by the cameras 1. The 3D object attribute information acquisition section 54 receives the 3D object attribute information outputted from the 3D object recognition module 30 and reads out various kinds of attribute information (data) such as the position, size, color, directional posture or the like the 3D object described in this 3D object attribute information.

The image generation section 53 includes a bird's-eye view image generation section 60, a substitute image output section 80, a normal image generation section 66, and a 3D image area determination section 67. The normal image generation section 66 adjusts a photographed image to an image suitable to be monitor-displayed as a vehicle periphery image. The vehicle periphery image to be monitor-displayed as a vehicle periphery image can be one selected by the driver from the photographed images obtained by the rear camera 1a, the left and right side cameras 1b, 1c, the front camera 1d or a desired combination of a plurality of photographed images. The 3D object image area determination section 67 determines an image area for a 3D object in the photographed image, based on the position information of the recognized 3D object included in the 3D object attribute information from the 3D object attribute information acquisition section 54. In this, a 3D object image area can be determined for a photographed image or a bird's-eye view image or both of these.

The bird's-eye view image generation section 60 includes a bird's-eye view photographed image generation section 63 for generating a bird's-eye view image through a viewpoint transformation process from one or a plurality of photographed image(s) mapped in the photographed image memory 51. In this embodiment, the section 60 further includes a bird's-eye view substitute image generation section 64 for generating a bird's-eye view image through a viewpoint transformation from a substitute image as will be detailed later. Incidentally, in the instant embodiment, the projection transformations effected at the bird's-eye view photographed image generation section 63 and the bird's-eye view substitute image generation section 64 are realized through map transformation using a mapping table. Therefore, there are selectively stored in advance various mapping tables for projection transformations used here. An individual mapping table or a group of a plurality of mapping tables selectively stored as described above is referred to herein as the mapping table 62. Each mapping table (will be referred to simply as "a map" hereinafter) constituting the mapping table 62 can be configured in many ways. In this embodiment, they are configured as a map describing correlation between pixel data of a photographed image and pixel data of projection transformed image (normally, bird's-eye view photographed image) and a map describing correlation between pixel values of a substitute image and pixel values of projection transformed image. In particular, for each pixel of one frame of photographed image, there is described a destination pixel coordinate in the bird's-eye view photographed image. And, for each in-vehicle camera, a different map will be applied. The projection transformation selection section 61 selects, for the bird's-eye view substitute image generation section 64, a projection transformation that best matches a bird's-eye view photographed image, based on attributes read out of the 3D object attribute information.

In the bird's-eye view substitute image generation section 64 too, there are set a plurality of kinds of projection transformations. The selection of a projection transformation to be effected at the bird's-eye view substitute image generation section 64 is effected by the projection transformation selection section 61, based on the type of the substitution object (3D object), the type of the projection transformation (viewpoint position) of the photographed image (bird's-eye view photographed image) as the source for synthesis. Incidentally, the bird's-eye view substitute image generation section 64 has a further function of outputting an inputted substitute image as it is.

The substitute image output section 80 includes a search condition setting section 85, a substitute image database 82, a substitute image retrieval section 83, and a substitute image coloration section 81. The substitute image database 82 registers and stores therein, as substitute images, images (photos, illustrations, etc.) created in advance respectively for various possible forms of 3D objects (a human, an automobile, etc.) that can be recognized by the 3D object recognition section 32, according to the directional posture of the 3D object (forward facing, lateral facing, rearward facing, etc.) in such a manner that they are selectable by search conditions. The search condition setting section 85 sets a search condition for retrieving a suitable substitute image from the substitute image database 82, based on the respective kinds of attribute information (data) such as the position, the size, the color, the directional posture etc. of the 3D object read from the 3D object attribute information by the 3D object attribute information acquisition section 54. The substitute image retrieval section 83 effects retrieval from the substitute image database based on a search condition set by the search condition setting section 85. The substitute image coloration section 81 applies a color to the retrieved substitute image based on the color information included in the 3D object attribute information. The manner of coloration can be selected appropriately, depending on the substitute image. For instance, in the case of a human, appropriate colors can be provided to respective coloring areas separately set for the upper body half and the lower body half. Or, the whole image may be painted with an appropriate color entirely. Further alternatively, a suitable color can be provided in advance. Here, a "suitable color" means a color which allows easy identification of the actual 3D object by the driver based on the substitute image added with this color. In the case of a road cone, a suitable color will be orange or yellow provided in advance. In the case of a human, the suitable color will be the color of a jacket or a skirt that can be obtained from a photographed image. In the case of an automobile, the suitable color will be the vehicle color obtained from its photographed image or 3D object attribute information.

The image synthesis section 55 effects superposing synthesis of superposing a bird's-eye view substitute image generated by the bird's-eye view substitute image generation section 64 on the 3D image area of the bird's-eye view photographed image. The method of this synthesis is not limited to the superposition or overwriting described above. The method of superposing through transparent background can be used instead, for instance. A synthesized bird's-eye view image with a substitute image will be transmitted as a displaying image to the frame memory 56 to be displayed on the screen of the monitor 21 as a display screen via the display control section 71.

Figure 13:
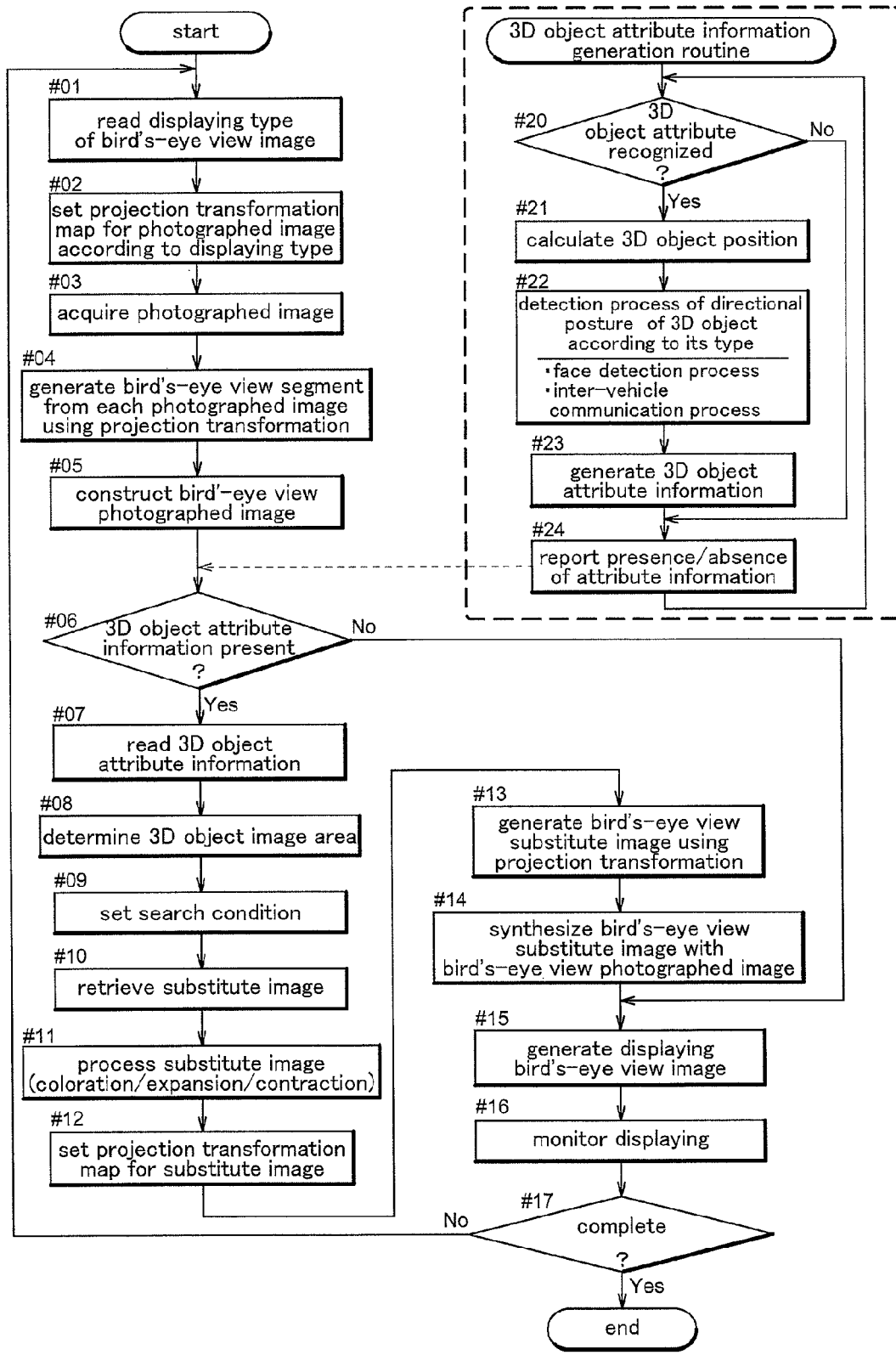
FIG. 13 is a flowchart illustrating the flow of control for displaying a bird's-eye view image in which a 3D object image is substituted by the substitute image relating to the second embodiment.
Figure 14:
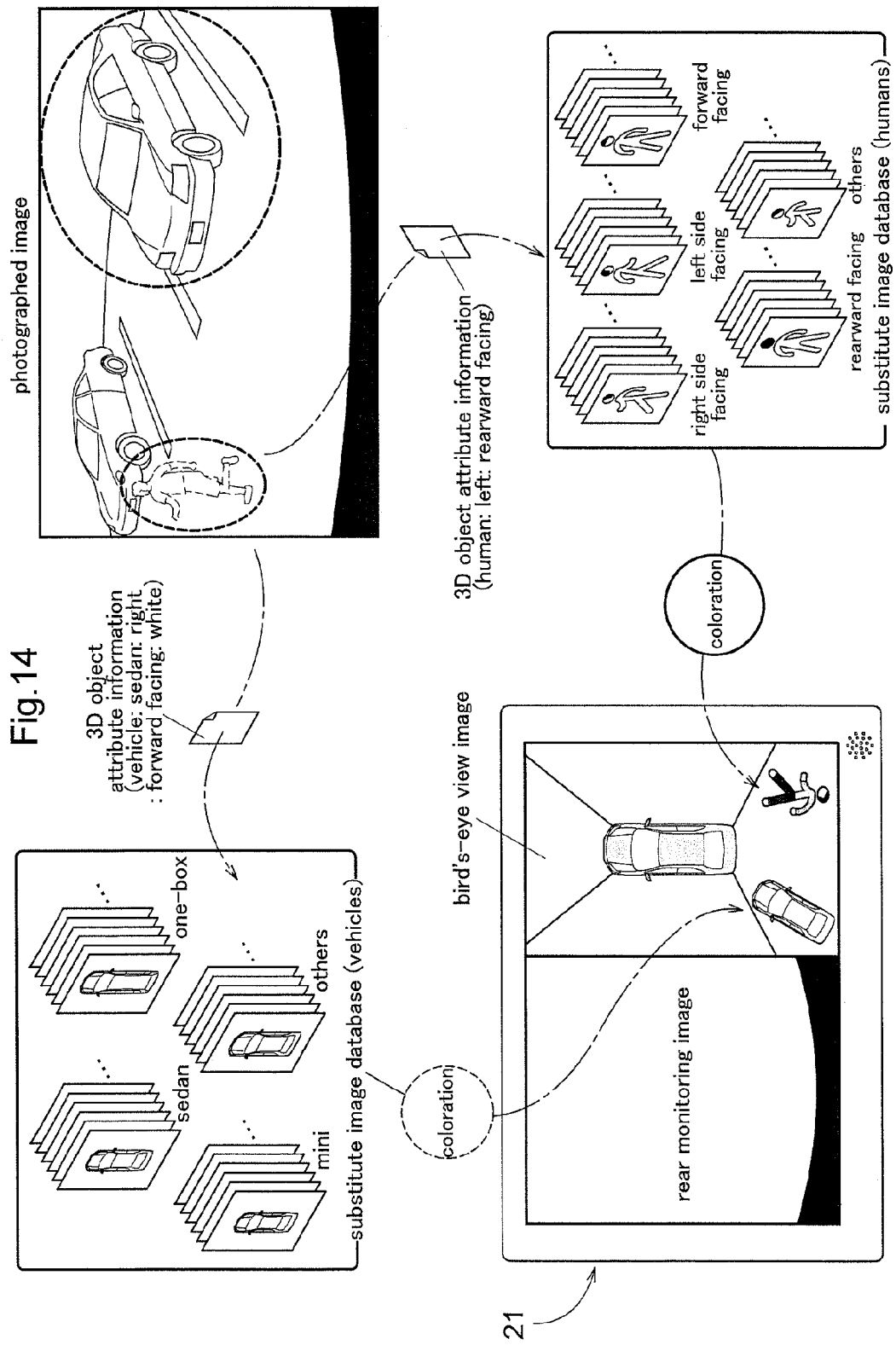
FIG. 14 is a schematic diagram illustrating a process of displaying the bird's-eye view image comprising a 3D object image substituted by a substitute image relating to the second embodiment.

Next, the flow of bird's-eye view image displaying routine by the vehicle periphery monitoring system incorporating the image generation device configured as described above will be explained with using the flowchart in FIG. 13 and the explanatory view in FIG. 14.

Upon start of a bird's-eye view image displaying routine for the purpose of vehicle periphery monitoring, firstly, there is read out a displaying type of a bird's-eye view image which has been manually set by the driver's desire or set as a default setting (#01). Here, the displaying type of the bird's-eye view image is done for defining photographed images, the position of the virtual viewpoint for use in generation of the bird's-eye view image of the vehicle periphery, the layout of the generated bird's-eye view image on the monitor screen, etc. A map for projection transformation for use by the bird's-eye view photographed image generation section 63 in accordance with the displaying type of the read bird's-eye view image will be set for each photographed image of the in-vehicle camera 1 to be used (#02). Photographed images of the four in-vehicle cameras 1 are acquired (#03). With using the set map, a bird's-eye view image segment is generated from each photographed image (#04). The resultant generated bird's-eye view image segments are combined and a bird's-eye view image (this can be an illustration, a symbol) of the vehicle set in advance of the position of the self vehicle is disposed and a bird's-eye view image for displaying is generated (#05).

In parallel with execution of the above-described routine, a 3D object attribute information generation routine too is executed. Firstly, the process checks through the 3D object recognition module 30 whether a 3D object has been recognized in the photographic area or not (#20). If a 3D object is recognized (YES branching at #20), the process calculates the position of this 3D object (#21). Further, the process executes type identification/directional posture detection process of the 3D object (#22). As examples of this type identification/directional posture detection process, there are face detection process and inter-vehicle communication process. In the face detection process, face detection is effected to the area of the recognized 3D object in the photographed image. If a face is detected, it is determined that this 3D object is a human. And, based on the directional posture of its face, the directional posture of the human such as a forward facing directional posture or a lateral facing directional posture, can be surmised also. In the inter-vehicle communication process, upon realization of inter-vehicle communication relative to the 3D object, it is determined that this 3D object is an automobile. Further, automobile attribute values such as the position or the directional posture of this vehicle, the vehicle type (vehicle model) can be acquired also. In this type/directional posture detection process, if e.g. type identification was not possible, this 3D object will be treated as being indefinite for its type/directional posture. Based on the result of type/directional posture detection process, 3D object attribute information is generated (#23). If no 3D object is recognized (NO branching at #20), no 3D object attribute information will be generated, as a matter of course. However, in either case, at this stage, attribute information presence/absence report will be outputted (#24).

Now, referring back to the bird's-eye view image displaying routine, based on the above-described attribute information presence/absence report, the process checks whether 3D object attribute information is being outputted from the 3D object recognition module 30 or not (#06). If no 3D object attribute information is being outputted (NO branching at #06), it is determined that no 3D object of interest is included in any of the photographed images, and the bird's-eye view photographed image generated at step #05 is used as it is to generate a display bird's-eye view image (#15). This generated display bird's-eye view image is displayed on the monitor 21 (#16). And, unless ending instruction for this bird's-eye view image displaying routine is present (NO branching at #17), the process returns to step #01 to repeat this routine.

If it is found at the checking at step #06 that 3D object attribute information has been generated by the 3D object recognition module 30 (YES branching at #06), it is determined that a 3D object of interest is included in the photographed images and 3D object attribute information is acquired. Then, firstly, data of the position, the type, the directional posture, the size of the recognized 3D object included in this 3D object attribute information are read out (#07). Based on the read data relating to the position of the 3D object, an image area for this 3D object in the bird's-eye view photographed image is determined (#08).

Subsequently, based on the read 3D object attribute information, a search condition for retrieving an appropriate substitute image is set (#09). With using this search condition, a substitute image is retrieved from the substitute image database 82 and mapped in the memory (#10). If needed, an image processing will be effected on the retrieved substitute image (#11). The image processing includes, e.g. an expansion/contraction process for causing the size of the retrieved substitute image to agree to the size of the 3D object image area, and a coloring process for coloring a coloring area predetermined in the substitute image based on color information included in the 3D object attribute information. Incidentally, as the color information included in the 3D object attribute information is based on pixel values of the 3D object included in the photographed image, it may happen that a color originally characterizing the 3D object is not detected, due to e.g. illumination condition. In this coloring process, if it is determined that such situation as above is present, the color to be added to the substitute image will be enhanced. Alternatively, a contour enhancement process for enhancing the contour of the substitute image may be effected on the substitute image.

For the colored substitute image, an optimal projection transformation is selected, based on the type of the projection transformation effected on the photographed images (viewpoint), and type, directional posture of the 3D object substituted by the substitute image and its mapping data is set in the bird's-eye view substitute image generation section 64 (#12) and the substitute image is subjected to this projection transformation (#13). Needless to say, mapping data for "through process" may be set, so that a substitute image not subjected to at least any projection transformation may be generated. Next, the bird's-eye view substitute image is superposed on the 3D object image area of the bird's-eye view photographed image to be synthesized therewith (#14). The final bird's-eye view image of vehicle periphery thus generated is generated as a displaying bird's-eye view image as shown in FIG. 14 (#15) and displayed on the monitor 21 (#16). Lastly, the process checks whether an ending check for this routine, e.g. an ending instruction for this rear monitoring routine is present or not (#17). Unless this rear monitoring routine is continued (NO branching at #17), the process returns to step #01 and repeat the above-described procedure.

3. Other Embodiments (1) In the foregoing embodiments, there was described an example wherein one 3D object of interest is included in one of photographed images obtained by the four cameras 1. In a border area of views of adjacently disposed cameras, a single 3D object of interest may be included in a plurality of photographed images. Therefore, in such an embodiment wherein a plurality of in-vehicle cameras are disposed for photographing the whole-periphery of the vehicle, if a 3D object is included in photographed images of two or more cameras, preferably, a 3D object image having a larger 3D object area is retrieved for generation of 3D object bird's-eye view image.

(2) A plurality of 3D objects, as objects of interest, i.e. a plurality of substitute images, may be synthesized with photographed bird's-eye view images.

Figure 15:
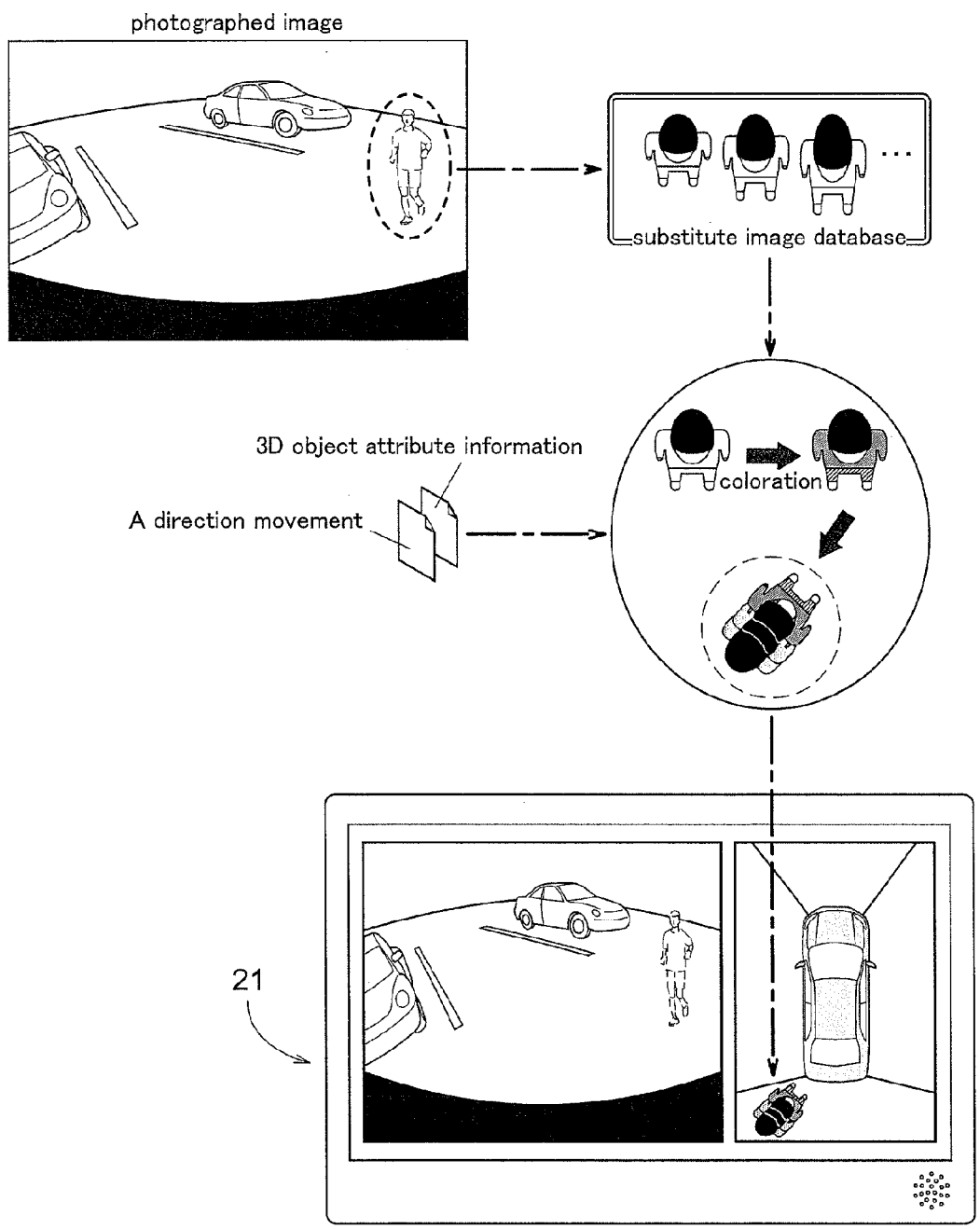
FIG. 15 is a schematic diagram illustrating a process of displaying a bird's-eye view image comprising a 3D object image substituted by a substitute image added with an after-image indicating the moving direction of a 3D object relating to a further embodiment.
Figure 16:
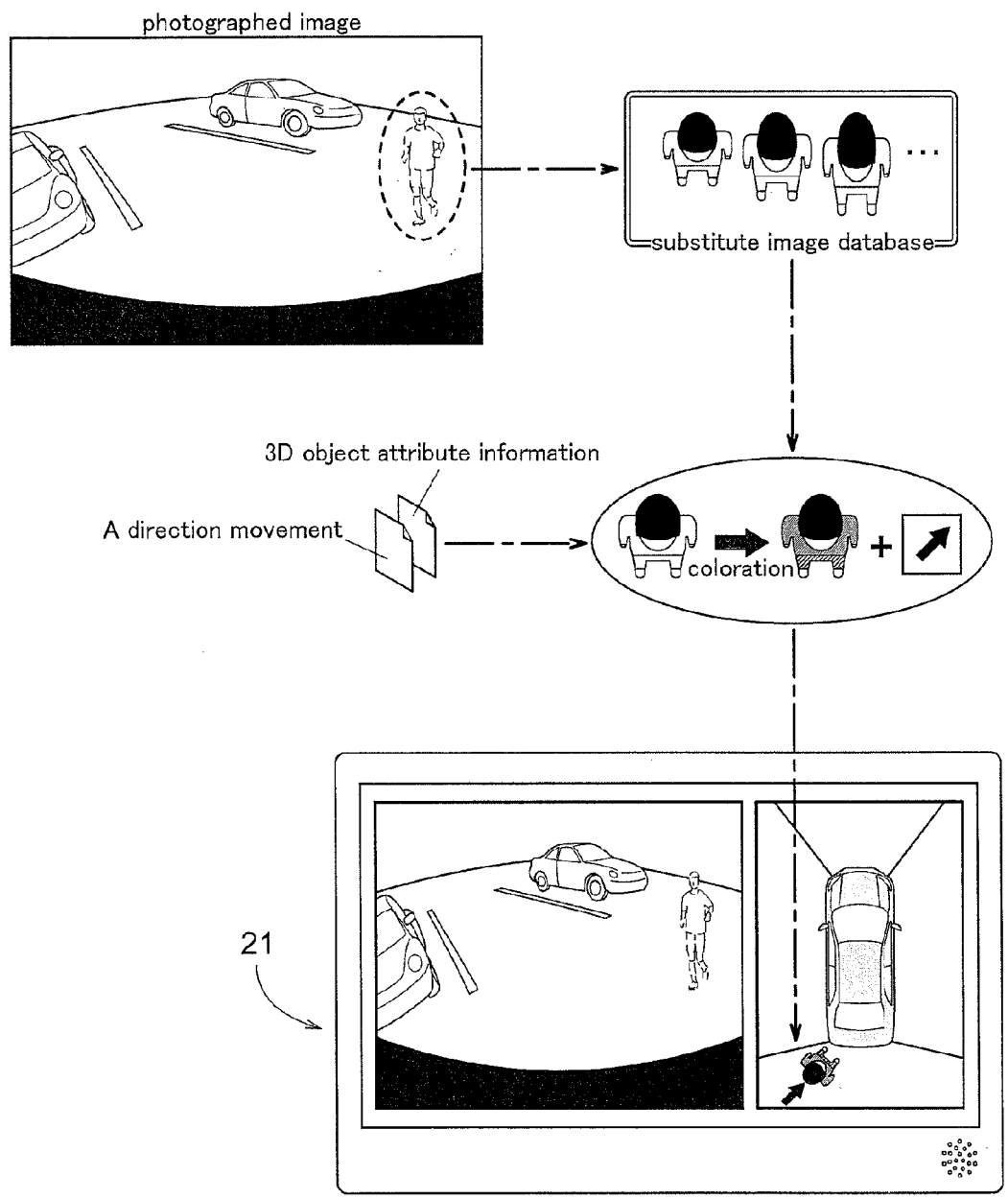
FIG. 16 is a schematic diagram illustrating a process of displaying a bird's-eye view image comprising a 3D object image substituted by a substitute image added with an arrow indicating the moving direction of a 3D object relating to a further embodiment.

(3) The first embodiment described above effects only substitution of a 3D object image by a colored substitute image. However, in case the moving direction of the 3D object has been evaluated, it is preferred that the colored substitute image be displayed in such a manner as to allow visual recognition of the moving direction of this 3D object also. In this respect, as shown in FIG. 15, it is possible to employ a substitute image added with an afterimage indicating the moving direction of the 3D object. Further alternatively, as shown in FIG. 16, it is possible to employ a substitute image added with an arrow indicating the moving direction of the 3D object.

(4) In the first embodiment described above, as a method of 3D object detection, there were proposed the 3D object detection using ultrasonic wave, 3D object detection through image recognition or combination thereof. Needless to say, using any other 3D object detection method, e.g. the laser radar method, the infrared beam method, is also understood to be included within the scope of the present invention.

(5) In the second embodiment described above, as a displaying bird's-eye view image, there were employed bird's-eye view images of the immediately overhead viewpoint, from four photographed images. Instead of this, as a displaying bird's-eye view image, it is possible to employ a bird's-eye view image obtained by effecting viewpoint transformation on a single photographed image.

INDUSTRIAL APPLICABILITY

The present invention is applicable to any system for effecting monitoring of a vehicle periphery with using a bird's-eye view image.

DESCRIPTION OF REFERENCE MARKS/NUMERALS

21: monitor
24: external communication section (inter-vehicle communication section)
30: 3D object detection module
31: 3D object detection section
32: 3D object recognition section
33: face detection section
34: communication information processing section
50: image processing module
53: image generation section
54: 3D object attribute information acquisition section
55: image synthesis section
60: bird's-eye view image generation section
61: normal view generation section
62: mapping table
63: bird's-eye view photographed image generation section
64: bird's-eye view substitute image generation section
65: 3D object bird's-eye view image generation section
67: 3D object image area determination section
80: substitute image output section
81: substitute image coloration section
82: substitute image database
83: substitute image retrieval section
84: color enhancement instruction section
85: search condition setting section

The invention claimed is:

1. An image generation device configured to output, as a displaying image, a bird's-eye view image generated by projection transformation at an upper virtual viewpoint of a photographed image obtained by an in-vehicle camera for photographing a peripheral area of a vehicle, the image generation device comprising:
an ECU configured to:
recognize a 3D object present in the peripheral area and output 3D object attribute information representing attribute of the 3D object;
determine a 3D object image area which is an image area of the 3D object in the photographed image based on position information included in the 3D object attribute information;
output at least one of a substitute image of the 3D object colored with a color based on color information included in the 3D object attribute information and a substitute image of the 3D object with a directional posture identified for the 3D object identified based on type information and directional posture information included in the 3D object attribute information;
generate a bird's-eye view image synthesized and attached with a substitute image output from the ECU at a position in the 3D object image area; and
divide the 3D object into areas along a height direction from a road surface or a horizontal direction, and color each area with an average color of the area or a representative color of the area.

2. The image generation device according to claim 1, wherein the ECU is further configured to:
store substitute images of 3D objects based on color information;
retrieve, from the ECU, a substitute image of the 3D object based on 3D object type information included in the 3D object attribute information; and
color a substitute image retrieved by the substitute image retrieval section with a color based on color information included in the 3D object attribute information.

3. The image generation device according to claim 2, wherein the ECU is further configured to determine a plurality of colors for characterizing the 3D object based on the color information and paints the substitute image with the plurality of colors separately.

4. The image generation device according to claim 2, wherein the ECU is further configured to output a color enhancement instruction for enhancing the color to be added to the substitute image by the ECU, based on the 3D object attribute information.

5. The image generation device according to claim 1, wherein the ECU is further configured to generate a bird's-eye view photographed image of the vehicle periphery from a plurality of photographed images covering the vehicle periphery and having different photographing directions with using projection transformation, and apply the substitute image to the 3D object image area of the bird's-eye view photographed image.

6. The image generation device according to claim 1, wherein in addition to the substitute image, there is provided an image showing the moving direction of the 3D object.

7. The image generation device according to claim 6, wherein the image showing the moving direction of the 3D object is an after-image of the substitute image corresponding to the movement of the 3D object.

8. The image generation device according to claim 6, wherein the image showing the moving direction of the 3D object is an arrow.

9. The image generation device according to claim 1, wherein the ECU is further configured to:

store substitute images of 3D objects based on type information and directional posture information; and retrieve, from the substitute image database, the substitute image with using the type information and the directional posture information included in the 3D object attribute information as a search condition.

10. The image generation device according to claim 1, wherein the ECU is further configured to detect a human face, and based on a detection result, the recognized 3D object comprising a human being set as the type information and one of the forward-facing directional posture, a rearward-facing directional posture and a lateral facing directional posture being set as the directional posture information.

11. The image generation device according to claim 1, wherein in the ECU, based on inter-vehicle communication information obtained by inter-vehicle communication, a recognized 3D object comprising an automobile is set as the type information, and the automobile assuming one of the forward facing directional posture, the rearward facing directional posture and the lateral facing directional posture is set as the directional posture information.

12. The image generation device according to claim 1, wherein the ECU is further configured to generate a bird's-eye view photographed image of the vehicle periphery from a plurality of photographed images covering the periphery of the vehicle and having different photographing directions, with using projection transformation; and the image synthesis section applies the substitute image to the 3D object image area of the bird's-eye view photographed image.

13. The image generation device according to claim 1, wherein the photographed image is an image of the vehicle along its traveling direction.

14. The image generation device according to claim 2, wherein the ECU is further configured to color a substitute image retrieved by the ECU with color based on pixel values of the photographed image as color information included in the 3D object attribute information.

* * * * *